(12) United States Patent
Nukala et al.

(10) Patent No.: US 11,075,950 B2
(45) Date of Patent: Jul. 27, 2021

(54) GENERATION OF SECURITY POLICIES FOR MICROSEGMENTED COMPUTER NETWORKS

(71) Applicant: CA, Inc., New York, NY (US)

(72) Inventors: Krishna Kumar Yadav Nukala, Telangana (IN); Vikas Pullagura, Andhra Pradesh (IN); Dharanidhar Sahu, Telangana (IN); Jagadishwara Chary Sriramoju, Telangana (IN); Lakshmi Priya Vennapusa, Andhra Pradesh (IN)

(73) Assignee: CA, Inc., San Jose, CA (US)

( * ) Notice: Subject to any disclaimer, the term of this patent is extended or adjusted under 35 U.S.C. 154(b) by 192 days.

(21) Appl. No.: 15/999,552

(22) Filed: Aug. 20, 2018

(65) Prior Publication Data

US 2020/0059491 A1    Feb. 20, 2020

(51) Int. Cl.
*H04L 29/08* (2006.01)
*H04L 29/06* (2006.01)
*H04L 12/26* (2006.01)
*H04L 29/12* (2006.01)

(52) U.S. Cl.
CPC ............ *H04L 63/20* (2013.01); *H04L 43/062* (2013.01); *H04L 43/16* (2013.01); *H04L 61/2517* (2013.01)

(58) Field of Classification Search
CPC ................................ H04L 63/20; H04L 43/16
USPC .......................................................... 726/1
See application file for complete search history.

(56) References Cited

U.S. PATENT DOCUMENTS 10,212,041 B1 *    2/2019    Rastogi ................... H04L 41/12

* cited by examiner

*Primary Examiner* — Anthony D Brown
(74) *Attorney, Agent, or Firm* — Shook, Hardy & Bacon L.L.P.

(57) ABSTRACT

A computer-implemented method of generating a security policy for a microsegmented computing system is provided. The method includes generating a port service map that indicates inbound packet activity by port for a plurality of network addresses within the microsegmented computing system and a port distribution map that indicates inbound packet activity by port for a plurality of network addresses within the microsegmented computing system, and generating a list of security policy recommendations based on the port service map and/or the port distribution map.

19 Claims, 19 Drawing Sheets

GENERATION OF SECURITY POLICIES FOR MICROSEGMENTED COMPUTER NETWORKS

BACKGROUND

The present application relates to security in computing systems, and in particular to computing systems that employ microsegmentation for security.

To protect devices in a computer network from unauthorized access, the devices may be deployed behind a firewall that filters incoming packets originating from outside the network and accepts or rejects the packets based on a security policy. For example, the security policy may define the ports on which one or more of the devices in the network will accept an incoming connection. Accordingly, an incoming packet request is received first at the firewall, which checks the packet to determine if the identified destination IP address and port are permitted. If so, the packet is forwarded to the destination IP address within the network. Otherwise, the packet is discarded and an error message may be sent back to the originator.

FIG. 1 illustrates a computer communication system including a plurality of servers 60. The servers 60 are accessible by one or more client applications 20 via an external communication network 50. Each server 10 and each client application 20 is characterized by a network address, such as an IP address, by which it can be reached through the network 50.

FIG. 2A illustrates a connection between an external client 70 and a web server 60 through a firewall 40. The external client 70 transmits an HTTP request to the web server 60. The HTTP request specifies a destination port of 80, which corresponds to an HTTP service running on the web server 60. The HTTP request specifies a source port of 21000, which is the port the web server 60 responds to when responding to the HTTP request. Accordingly, the HTTP request transmitted by the client application 70 is characterized by a tuple, namely, {source IP, source port, destination IP, destination port} of {141.202.208.225, 21000, 10.145.201.139, 80}. Because the source port is greater than 1024, it may be a so-called "ephemeral port" that is temporarily assigned for use by the client application 70. In some computing systems, ports having a port number from 1025 to 65535 may be configured as ephemeral ports. The Internet Assigned Numbers Authority (IANA) suggests the range of 49152 to 65535 for ephemeral ports. However, the assignment of ephemeral ports may differ from system to system.

The web server 60 processes the HTTP request and responsively transmits an HTTP response to the client application 20 that is characterized by the tuple {10.145.201.139, 80, 141.202.208.225, 21000}. Each of these transmissions is typically logged by a gateway or router that routes the message to the appropriate destination.

FIG. 2B illustrates an intra-system request from one server, such as an application server 10A, to another server, such as a database server 60B, behind a firewall 40. A database request is sent by the application server 60A to port 500 of the database server 60B. The database response is sent back by the database server 60B to port 480 of the application server 60A. However, since neither the database request nor the database response crosses the firewall boundary, neither communication may be analyzed to determine if it is allowable. If one of the servers 60A, 60B is compromised, it may have unfettered access to the ports of other servers within the computing system.

A firewall is typically deployed at the boundary of a computing system, and does not control intra-system communications that do not cross the firewall boundary. Microsegmentation is a technique by which a computing system can manage flows at a more granular level, such as between servers within a computing system. To implement microsegmentation, it is desirable to have a detailed understanding of the network addresses and ports that are permitted to be used within a system. However, such information may not be known in advance and may not be well documented. In order to properly configure a microsegmentation security system, a security recommendation may be generated that includes a list of tuples including source IP address, destination IP address and destination port that will be allowed within the system. Messages that do not specify an allowed combination of source IP address, destination IP address and destination port in accordance with the security policy may be blocked by the system.

FIG. 2C is a schematic block diagram that illustrates an intra-system request from one server to another server in a system employing microsegmentation. As shown in FIG. 2C, an internal firewall 72 may be provided that applies security policies to intra-system communications. The internal firewall may be implemented as a separate device, such as an internal router in the network, as shown in FIG. 2C, or as front-end processing layers in the servers 60A, 60B. The internal firewall 72 is configured with a microsegmentation security policy that is used by the internal firewall 72 to determine whether to allow or block requests within the network that may not pass through the external firewall 40.

SUMMARY

A computer-implemented method of generating a security policy for a microsegmented computing system includes generating a port service map including a plurality of entries and that indicates inbound packet activity by port for a plurality of network addresses within the microsegmented computing system, and generating a first plurality of security policy recommendations based on the port service map.

Each entry in the port service map includes a destination network address and a destination port associated with the entry, and generating the first plurality of security policy recommendations includes generating a metric for each entry in the port service map, and obtaining a port traffic log of traffic in the microsegmented computing system. The port traffic log contains log records of packets transmitted in the microsegmented, and each log record in the port traffic log includes a source network address, source port number, destination network address and destination port number associated with the log record. The method further includes, for a selected log record in the port traffic log, determining if the metric for an entry in the port service map having a same destination network address and destination port as the selected log record is greater than a threshold, and in response to the metric for the entry in the port service map having the same destination network address and destination port as the selected log record being greater than the threshold, generating a security policy recommendation including the source network address, destination network address and destination port included in the selected log record.

The method may further include generating an estimated accuracy for each entry in the port service map. The metric for each entry in the port service map includes the estimated accuracy for the entry in the port service map.

The method may further include, for each security policy recommendation in the first plurality of security policy recommendations, assigning, to the security policy recommendation, an estimated accuracy based on the estimated accuracy for a corresponding entry in the port service map.

The method may further include generating a port distribution map including a plurality of entries and that indicates outbound packet activity by port for a plurality of network addresses within the microsegmented computing system, and generating a second plurality of security policy recommendations based on the port distribution map.

Each of the entries in the port distribution map includes a source network address and a source port associated with the entry, and generating the second plurality of security policy recommendations may include generating a metric for each entry in the port distribution map, and obtaining a port traffic log of traffic in the microsegmented computing system. The port traffic log contains log records of packets transmitted in the microsegmented, and each log record in the port traffic log includes a source network address, source port number, destination network address and destination port number associated with the log record. The method further includes, for a selected log record in the port traffic log, determining if the metric for an entry in the port distribution map having a same source network address and source port as the selected log record is greater than a threshold, and in response to the metric for the entry in the port service map having the same source network address and source port as the selected log record being greater than the threshold, and generating a security policy recommendation including the source network address, destination network address and destination port included in the selected log record.

The method may further include generating an estimated accuracy associated with each entry in the port distribution map. The metric for each entry in the port distribution map includes the estimated accuracy for the entry in the port distribution map.

The method may further include, for each security policy recommendation in the second plurality of security policy recommendations, assigning, to the security policy recommendation, an estimated accuracy based on the estimated accuracy for a corresponding entry in the port distribution map.

The method may further include generating an estimated accuracy for each entry in the port distribution map, and for each security policy recommendation in the first plurality of security policy recommendations, identifying a corresponding entry in the port distribution map corresponding to the security policy recommendation, determining whether the estimated accuracy for the corresponding entry in the port distribution map is greater than a threshold, and in response to determining that the estimated accuracy for the corresponding entry in the port distribution map is not greater than the threshold, marking the security policy recommendation as a false positive.

The method may further include generating estimated accuracies for each entry in the port service map and each entry in the port distribution map, combining the first plurality of security policy recommendations and the second plurality of security policy recommendations to form a recommendation list, for each security policy recommendation in the recommendation list identifying a first corresponding entry in the port distribution map corresponding to the security policy recommendation and a second corresponding entry in the port service map corresponding to the security policy recommendation, determining whether the estimated accuracy for the first corresponding entry in the port distribution map is greater than a first threshold, in response to determining that the estimated accuracy for the first corresponding entry in the port distribution map is not greater than the first threshold, marking the security policy recommendation as a false positive and assigning to the security policy recommendation an accuracy corresponding to an estimated accuracy for the second corresponding entry in the port service map, in response to determining that the estimated accuracy for the corresponding entry in the port distribution map is greater than the first threshold, determining whether the estimated accuracy for the second corresponding entry in the port service map is greater than a second threshold, and in response to determining that the estimated accuracy for the second corresponding entry in the port service map is not greater than the second threshold, marking the security policy recommendation as a false positive and assigning to the security policy recommendation an accuracy corresponding to an estimated accuracy for the corresponding entry in the port distribution map.

Generating the port service map may include obtaining a port traffic log of traffic in the microsegmented computing system. The port traffic log contains log records of packets transmitted in the microsegmented identified by source network address, source port number, destination network address and destination port number. The method further includes grouping log entries in the port traffic log by destination network address and destination port number pairs to form entries in the port service map, generating an inbound packet count, inbound_count, for each entry in the port service map, sorting the entries in the port service map by inbound packet count, and generating a difference value, inbound_diff, for each entry in the port service map, the difference value is generated by subtracting the inbound packet count for the next succeeding entry from the inbound packet count for the entry.

The method may further include determining a smallest value, min_count, of inbound_count in the port service map, starting with a first entry in the port service map having a highest inbound packet count, determining if each of a next n number of entries in the port service map satisfies the inequality inbound_diff<=min_count, where n is a positive integer, and in response to determining that each of the next n number of entries in the port service map satisfies the inequality inbound_diff<=min_count, determining a cut-off value, last_value, for the PSM.

Generating the port service map may include obtaining a port traffic log of traffic in the microsegmented computing system, grouping log entries in the port traffic log by destination network address and destination port number pairs to form entries in the port service map, generating an inbound packet count, inbound_count, for each entry in the port service map, sorting the entries in the port service map by inbound packet count, generating a moving average of inbound_count, moving_average, for each entry in the port service map, and generating an average difference value, avg_diff, for each entry in the port service map the value of avg_diff is generated by subtracting the value of moving_average for the next succeeding entry from the value of moving_average for the entry.

The method may further include determining a smallest value, min_count, of inbound_count in the port service map, starting with a first entry in the port service map having a highest inbound packet count, determining if each of a next n number of entries in the port service map satisfies the inequality avg_diff<=min_count, where n is a positive integer, and, in response to determining that each of the next n number of entries in the port service map satisfies the inequality avg_diff<=min_count, determining a cut-off value, last_value, for the PSM.

The method may further include generating an estimated accuracy for each of the security policy recommendations in the list of security policy recommendations, and generating a security policy based on the list of security policy recommendations and the accuracy of the security policy recommendations in the list of security policy recommendations.

The method may further include generating a microsegmentation security policy based on the first plurality of security policy recommendations, and applying the microsegmentation security policy to internal communications within the microsegmented computing system.

A computer-implemented method of generating a security policy for a microsegmented computing system according to further embodiments includes generating a port service map that indicates inbound packet activity by port for a plurality of network addresses within the microsegmented computing system, generating a port distribution map that indicates outbound packet activity by port for a plurality of network addresses within the microsegmented computing system, generating a plurality of security policy recommendations based on the port service map and the port distribution map, and generating an estimated accuracy for each security policy recommendation in the plurality of security policy recommendations based on the port service map and the port distribution map.

The method may further include identifying false positive security policy recommendations in the plurality of security policy recommendations based on the port service map and the port distribution map.

Generating the plurality of security policy recommendations may include generating a first plurality of security policy recommendations based on the port service map and validating the first plurality of security policy recommendations based on the port distribution map.

A computer-implemented method of generating a security policy for a microsegmented computing system according to further embodiments includes generating a port service map that indicates inbound packet activity by port for a plurality of network addresses within the microsegmented computing system, each entry in the port service map having an estimated accuracy, generating a port distribution map that indicates outbound packet activity by port for a plurality of network addresses within the microsegmented computing system, each entry in the port distribution map having an estimated accuracy, generating a plurality of security policy recommendations based on the port service map and the port distribution map, and validating the security policy recommendations based on estimated accuracies in the port service map and the port distribution map.

Other systems, methods, and/or computer program products according to embodiments of the inventive concepts will be or become apparent to one with skill in the art upon review of the following drawings and detailed description. It is intended that all such additional systems, methods, and/or computer program products be included within this description, be within the scope of the present inventive concepts, and be protected by the accompanying claims.

BRIEF DESCRIPTION OF THE DRAWINGS

The accompanying drawings, which are included to provide a further understanding of the inventive concepts and are incorporated in and constitute a part of this application, illustrate certain embodiment(s) of the inventive concepts. In the drawings.

DETAILED DESCRIPTION OF EMBODIMENTS

Embodiments of the present inventive concepts now will be described more fully hereinafter with reference to the accompanying drawings, in which embodiments of the inventive concepts are shown. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concepts. As used herein, the term "and/or" includes any and all combinations of one or more of the associated listed items.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

A method is disclosed herein for generating a security recommendation that includes one or more recommendations of source IP address, destination IP address and destination port that will be permitted in packets flowing within a computing system that uses microsegmentation.

Figure 1:
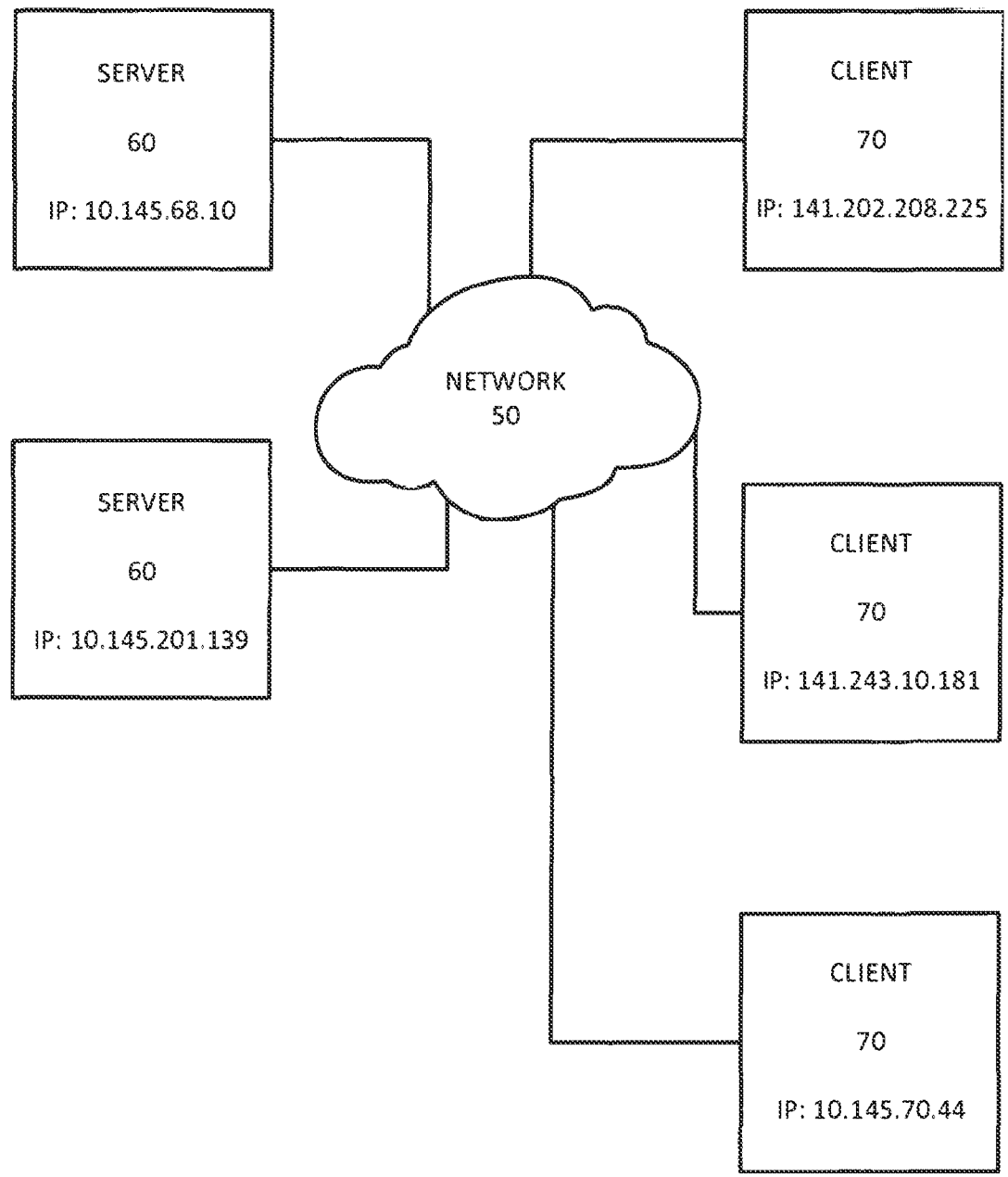
FIG. 1 is a schematic block diagram that illustrates a computer communication system including a plurality of servers.
Figure 2A:
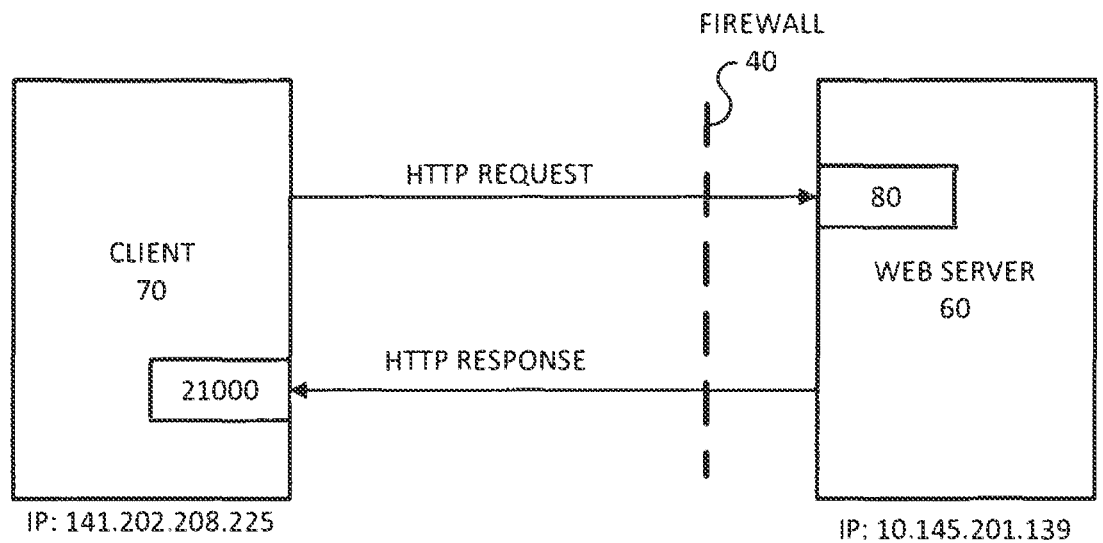
FIG. 2A is a schematic block diagram that illustrates a connection between an external client and a web server through a firewall.
Figure 2B:
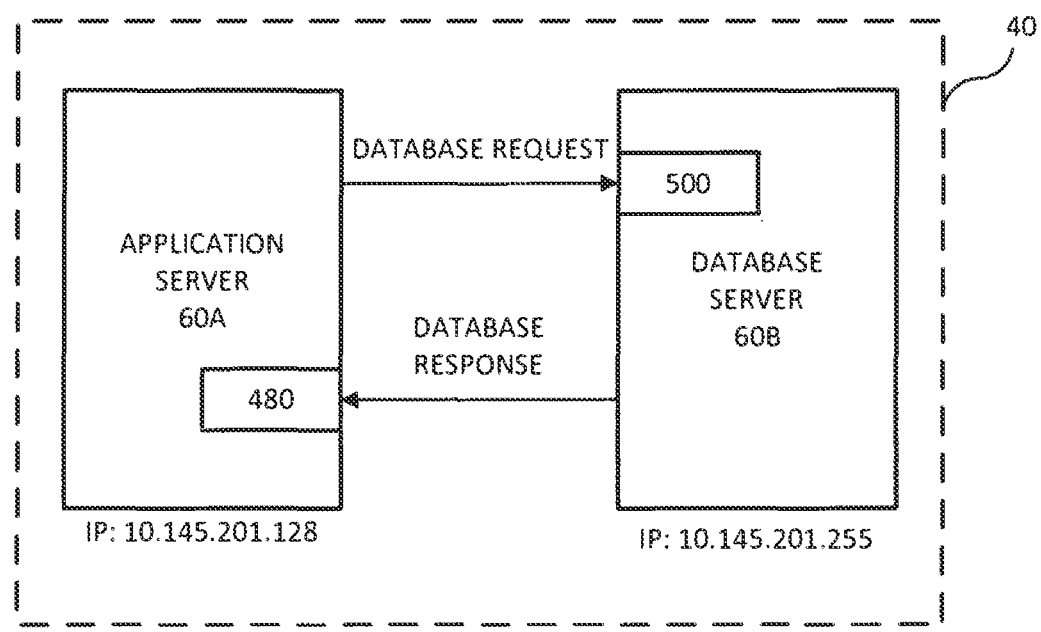
FIG. 2B is a schematic block diagram that illustrates an intra-system request from one server to another server behind a firewall.
Figure 2C:
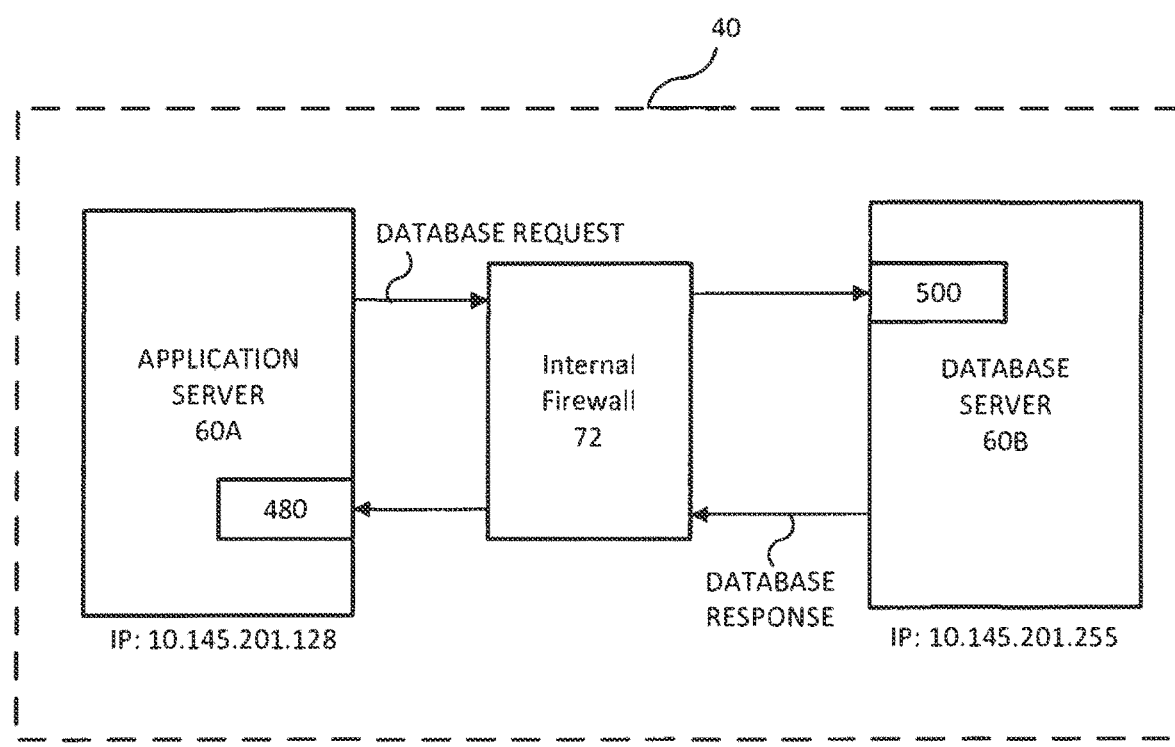
FIG. 2C is a schematic block diagram that illustrates an intra-system request from one server to another server in a system employing microsegmentation.
Figure 3A:
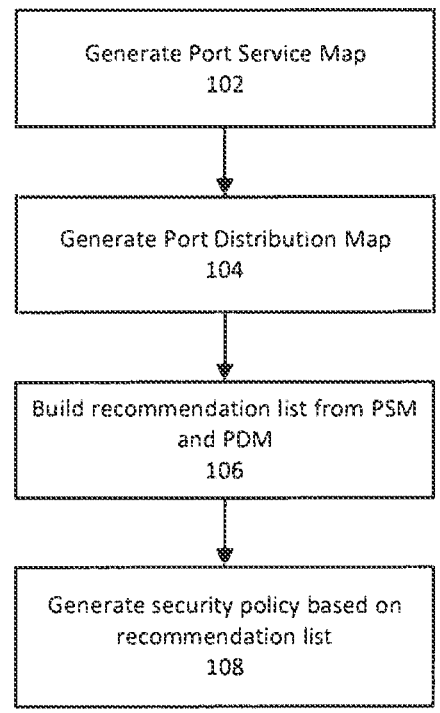
FIG. 3A is a flowchart that illustrates operations of systems/methods according to some embodiments.

Referring to FIG. 3A, a method of generating a security recommendation includes generating a port service map (PSM) (block 102). For a given IP address, a port service map is a map of inbound connections on each port for the IP address. According to some embodiments, the method may calculate an estimated accuracy associated with each entry in the PSM. The method generates a port distribution map (PDM), which is a map of outbound connections on each port for a given IP address (block 104). An estimated accuracy value may also be calculated for each entry in the PDM. The systems/methods then generate a set of security policy recommendations based on the PSM and PDM (block 108). The PSM and PDM may also be analyzed to identify false positive recommendations in the set of security policy recommendations. A "false positive" recommendation is a recommendation to open a {source address, destination address, destination port} tuple for communication in the system that should not be opened. In some embodiments, the operations of blocks 102, 104 and 106 may combined. Moreover, the port distribution map may be generated before the recommendation list is generated. An estimated accuracy of each recommendation may be calculated as the PDM and/or PSM are being generated or afterwards.

Finally, some embodiments generate a security policy based on the security recommendation list (block 108). The security policy thus generated may be automatically implemented using microsegmentation to manage communications within the computing system.

Figure 3B:
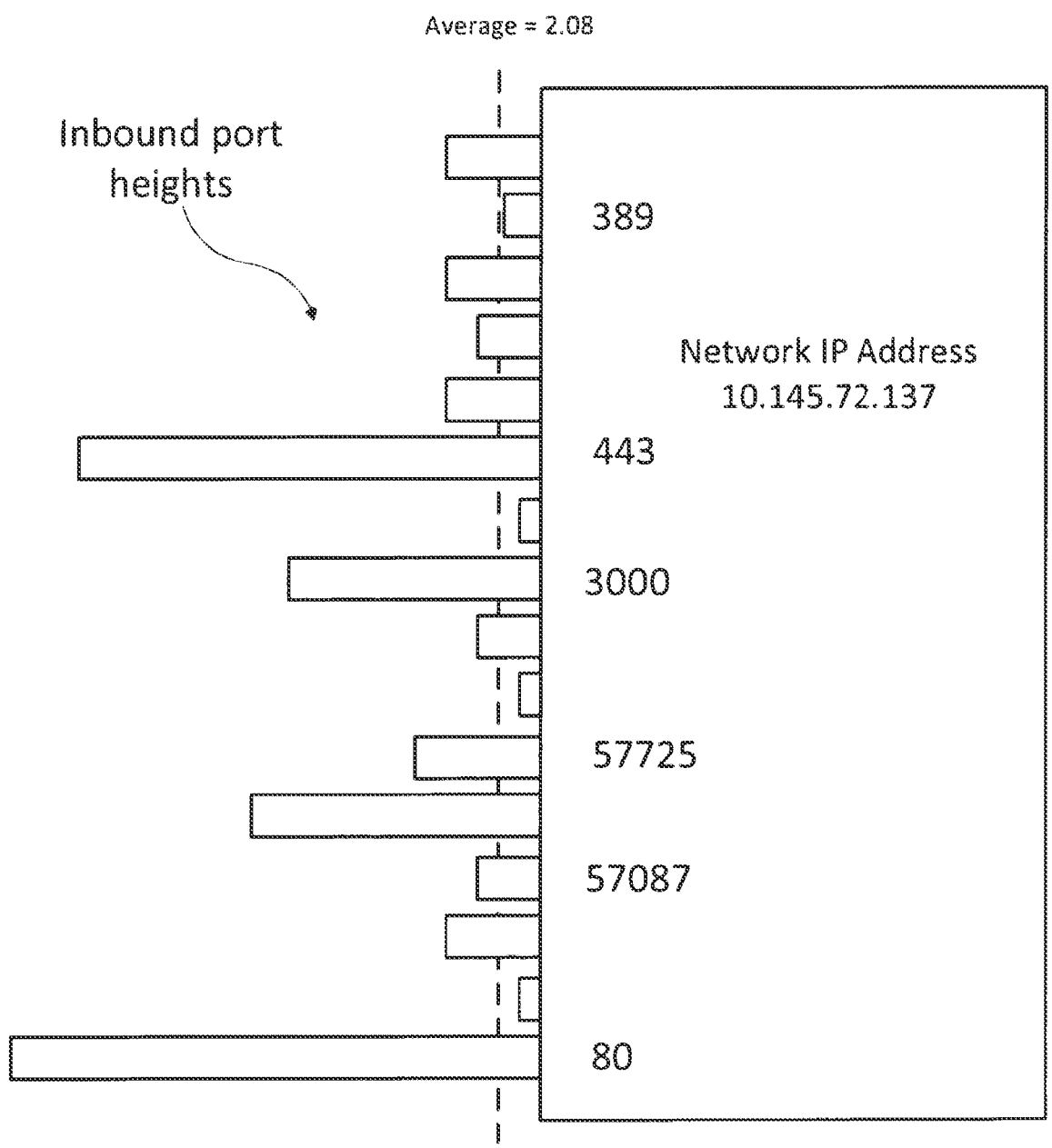
FIG. 3B schematically illustrates a port service map.

FIG. 3B schematically illustrates a port service map for a server having an IP address of 10.145.72.137. The PSM may be generated by analyzing log records of inbound requests received by the server. Each port that was used to connect with the server is represented by a bar having a (lateral) height that is roughly proportional to the number of connections made to that port. Only a subset of the active ports is illustrated in FIG. 3B for ease of explanation. As can be seen in FIG. 3B, most of the in-bound packets received at the server were directed to destination ports 443, 80 and 3000, and the average number of in-bound requests is 2.08 per port.

Figure 3C:
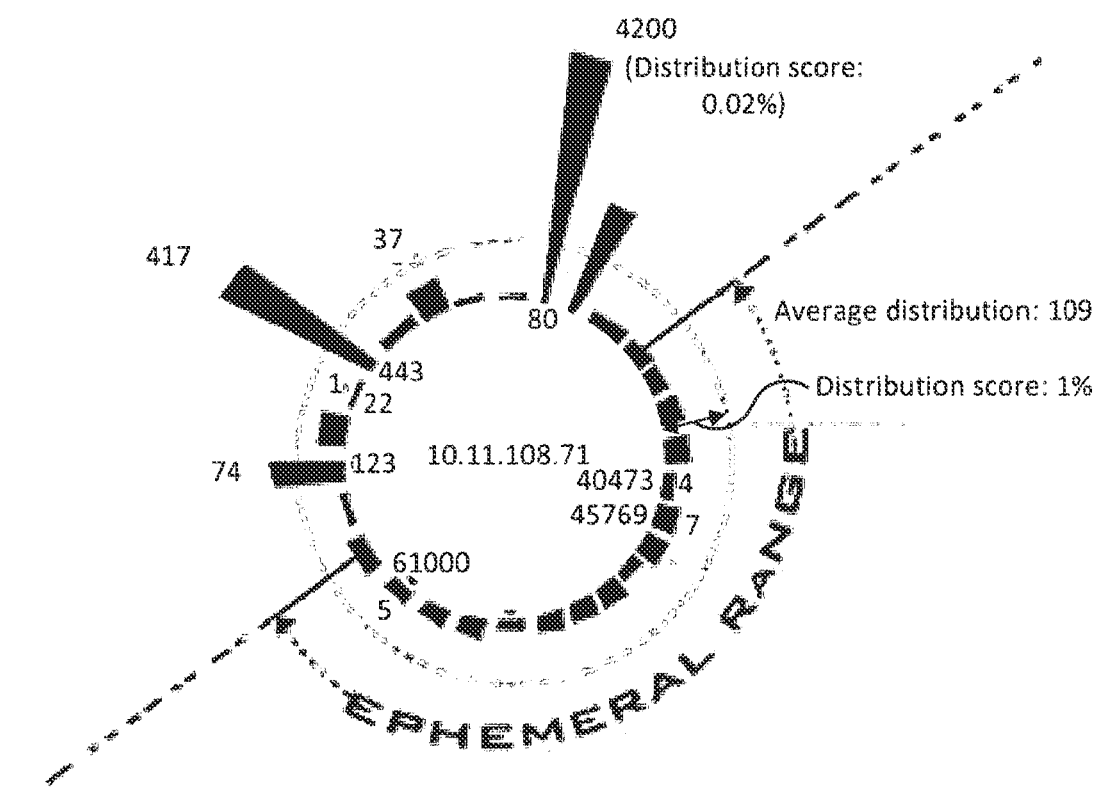
FIG. 3C schematically illustrates a port distribution map.

FIG. 3C illustrates a port distribution map for a server having an IP address of 10.11.108.71. The PDM may be generated by analyzing log records of all outbound requests transmitted by a server. Each port that was used to send a request is represented by an entry having a (radial) height that is roughly proportional to the number of connections made to that port. Only a subset of the active ports is illustrated in FIG. 3C for ease of explanation. As can be seen in FIG. 3C, most of the out-bound packets transmitted by the server were sent via ports 443, 80 and 123, which are outside the ephemeral range, and the average number of out-bound requests is 109 per port.

Figure 4:
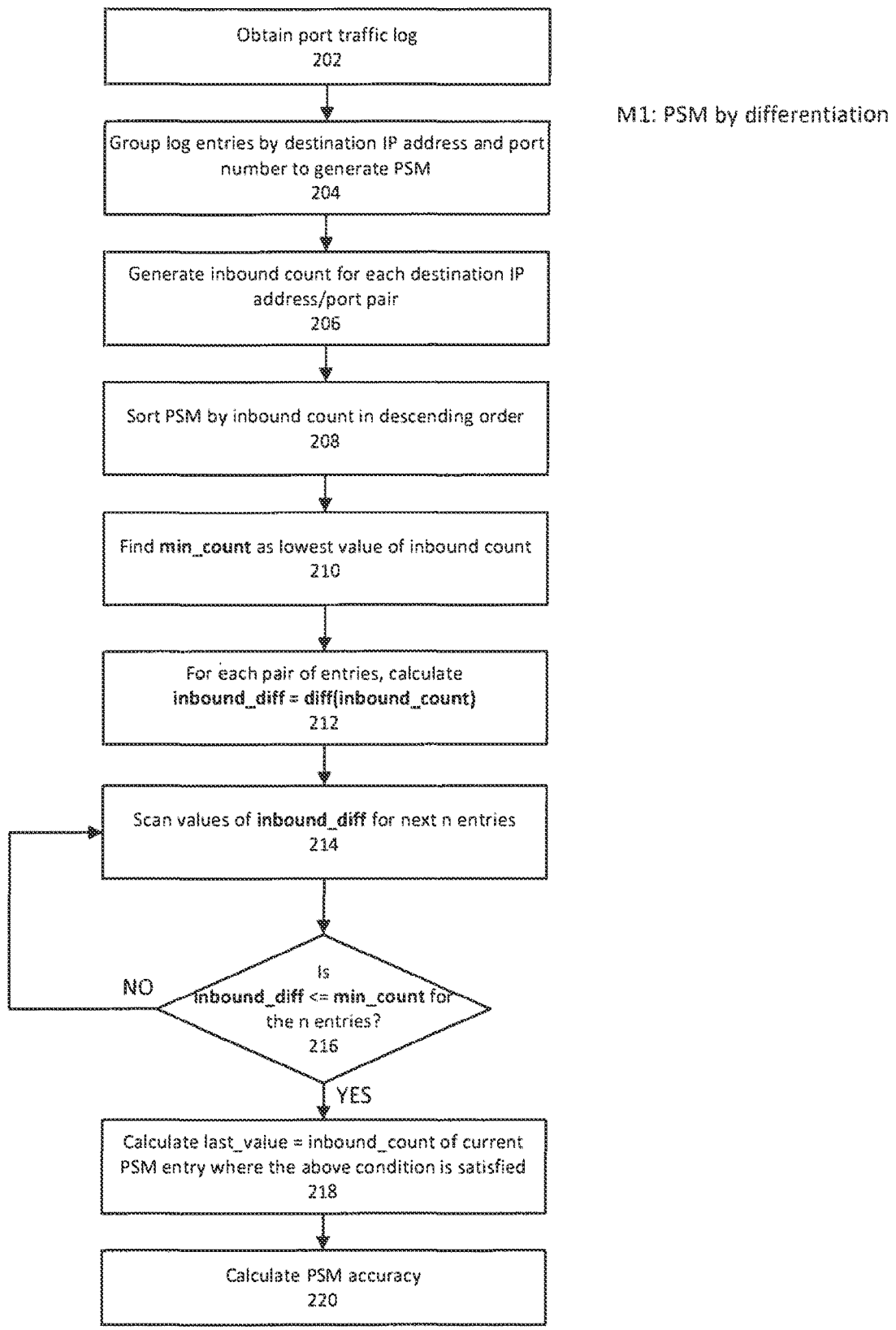
FIG. 4 is a flowchart that illustrates the generation of a port service map according to some embodiments.

FIG. 4 illustrates operations of systems/methods for generating a port service map (PSM) according to some embodiments. The systems/methods first obtain a port traffic log, which tracks each packet that is transmitted within a computing system (block 202). The port traffic log keeps track of at least the source IP address, source port, destination IP address, destination port and protocol for each packet transmitted within the system. An example of a portion of a port traffic log is shown in Table 1. Each entry in the log includes a source IP address, source port, destination IP address, destination port and protocol number.

TABLE 1

Raw Port Traffic Log

| src_ip | src_port | dest_ip | dest_port | protocol |
|---|---|---|---|---|
| 10.144.68.10 | 53 | 10.144.76.47 | 44356 | 17 |
| 10.144.69.49 | 48002 | 10.144.76.47 | 35622 | 6 |
| 10.144.76.47 | 37979 | 10.144.68.10 | 53 | 17 |
| 10.144.68.10 | 53 | 10.144.76.47 | 35294 | 17 |
| 10.144.68.10 | 53 | 10.144.76.47 | 46495 | 17 |
| 10.144.68.10 | 53 | 10.144.76.47 | 53663 | 17 |
| 10.144.76.47 | 35622 | 10.144.69.49 | 48002 | 6 |
| 10.144.69.49 | 48001 | 10.144.76.47 | 40916 | 6 |
| 10.144.76.47 | 53663 | 10.144.68.10 | 53 | 17 |
| 10.144.68.10 | 53 | 10.144.76.47 | 49400 | 17 |
| 10.144.68.10 | 53 | 10.144.76.47 | 37979 | 17 |
| 10.144.76.47 | 35294 | 10.144.68.10 | 53 | 17 |
| 10.144.76.47 | 46462 | 10.144.68.10 | 53 | 17 |
| 10.144.68.10 | 53 | 10.144.76.47 | 45649 | 17 |
| 10.144.69.49 | 48002 | 10.144.76.47 | 35637 | 6 |
| 10.144.76.47 | 44735 | 10.144.68.10 | 53 | 17 |
| 10.144.76.47 | 58113 | 10.144.68.10 | 53 | 17 |
| 10.144.68.10 | 53 | 10.144.76.47 | 59399 | 17 |
| 10.144.68.10 | 53 | 10.144.76.47 | 39568 | 17 |
| 10.144.76.47 | 60176 | 10.144.68.10 | 53 | 17 |
| 10.144.68.10 | 53 | 10.144.76.47 | 55903 | 17 |
| 10.144.69.49 | 48001 | 10.144.76.47 | 40931 | 6 |
| 10.144.69.49 | 48001 | 10.144.76.47 | 40922 | 6 |
| 10.144.68.10 | 53 | 10.144.76.47 | 60176 | 17 |
| 10.144.76.47 | 40931 | 10.144.69.49 | 48001 | 6 |
| 10.144.76.47 | 35623 | 10.144.69.49 | 48002 | 6 |
| 10.144.76.47 | 39568 | 10.144.68.10 | 53 | 17 |
| 10.144.76.47 | 60207 | 10.144.68.10 | 53 | 17 |
| 10.144.68.10 | 53 | 10.144.76.47 | 54911 | 17 |
| 10.144.68.10 | 53 | 10.144.76.47 | 51820 | 17 |
| 10.144.76.47 | 54911 | 10.144.68.10 | 53 | 17 |
| 10.144.68.10 | 53 | 10.144.76.47 | 44636 | 17 |
| 10.144.76.47 | 40937 | 10.144.69.49 | 48001 | 6 |
| 10.144.68.10 | 53 | 10.144.76.47 | 56252 | 17 |
| 10.144.76.47 | 57851 | 10.144.68.10 | 53 | 17 |

The log entries in the log are then grouped by destination IP address and destination port number to generate a PSM (block 204). The systems/methods then generate an inbound count of packets for each destination IP address/port pair (block 206). An example of a portion of a port traffic log that has been grouped by destination IP address and destination port is shown in Table 2. Table 2 also includes a column showing the inbound packet count for each destination IP address/port/protocol entry.

TABLE 2

Log entries sorted by destination IP address and port with inbound_count

| dest_ip | dest_port | protocol | inbound_count |
|---|---|---|---|
| 10.144.7.34 | 443 | 6 | 239 |
| 10.144.5.47 | 26215 | 17 | 2 |
| 10.144.70.41 | 0 | 1 | 6 |
| 10.144.133.123 | 111 | 17 | 11 |

TABLE 2-continued

Log entries sorted by destination IP
address and port with inbound_count

| dest_ip | dest_port | protocol | inbound_count |
|---|---|---|---|
| 10.144.196.64 | 3306 | 6 | 16 |
| 10.144.71.68 | 0 | 1 | 8 |
| 10.144.5.47 | 1521 | 6 | 608 |
| 10.144.4.143 | 137 | 17 | 1 |
| 10.144.135.44 | 3306 | 6 | 11346 |
| 10.144.12.213 | 54345 | 6 | 1 |
| 10.144.6.33 | 161 | 17 | 46 |
| 10.144.133.123 | 2049 | 6 | 1147 |
| 10.144.7.241 | 111 | 17 | 19 |
| 10.144.71.68 | 3306 | 6 | 6020 |
| 10.144.12.102 | 54345 | 6 | 1 |
| 10.144.10.155 | 443 | 6 | 2 |
| 10.144.12.235 | 111 | 17 | 6 |
| 10.144.4.143 | 0 | 1 | 7 |
| 10.144.7.92 | 445 | 6 | 20 |
| 10.144.4.143 | 445 | 6 | 1 |
| 10.144.7.128 | 0 | 1 | 4 |

For each destination IP address, the log entries are then sorted in descending order of the inbound_count (block 208), as shown in Table 3 below for destination IP address 10.144.6.33.

TABLE 3

PSM sorted by inbound_count for dest IP = 10.144.6.33

| dest_ip | dest_port | protocol | inbound_count |
|---|---|---|---|
| 10.144.6.33 | 135 | 6 | 191 |
| 10.144.6.33 | 137 | 17 | 62 |
| 10.144.6.33 | 0 | 1 | 48 |
| 10.144.6.33 | 46282 | 6 | 48 |
| 10.144.6.33 | 161 | 17 | 46 |
| 10.144.6.33 | 48000 | 6 | 37 |
| 10.144.6.33 | 49602 | 6 | 14 |
| 10.144.6.33 | 49256 | 6 | 14 |
| 10.144.6.33 | 51774 | 6 | 14 |
| 10.144.6.33 | 57274 | 6 | 14 |
| 10.144.6.33 | 51428 | 6 | 14 |
| 10.144.6.33 | 41444 | 6 | 12 |
| 10.144.6.33 | 43340 | 6 | 12 |
| 10.144.6.33 | 43686 | 6 | 12 |
| 10.144.6.33 | 59296 | 6 | 12 |
| 10.144.6.33 | 58950 | 6 | 12 |
| 10.144.6.33 | 45822 | 6 | 11 |
| 10.144.6.33 | 41790 | 6 | 11 |
| 10.144.6.33 | 47630 | 6 | 11 |
| 10.144.6.33 | 55456 | 6 | 11 |
| 10.144.6.33 | 55110 | 6 | 11 |
| 10.144.6.33 | 57620 | 6 | 11 |

For each destination IP address/destination port pair, the systems/methods then perform the following operations. First, a minimum count (min_count) is determined as minimum of inbound_count (block 210). In the example shown in Table 3, min_count is equal to 1. Next, the systems/methods calculate a differentiation according to the following equation:

$$\text{inbound\_diff} = \text{diff}(\text{inbound\_count}) \qquad [1]$$

as a function of inbound_count for each entry in the PSM (block 212). This can be achieved by subtracting the inbound_count of each row from the value of inbound_count in the following row.

The systems/methods then calculate a variable last_value, which is the value of inbound_count at the boundary of the service ports in the map that separates entries in the PSM for which a security policy recommendation should be generated from those that should not. The variable last_value can be computed as follows:

First, the systems/methods scan the values of inbound_diff of the next n entries of the PSM, where n is selected as a positive integer having a value of one or more (block 214). This determines a tradeoff between false positives and true recommendations. It has been empirically determined that n=3 gives a good tradeoff in some cases.

The systems/methods then check to see the condition of inbound_diff<=min_count for each of the next n entries (block 216). If the condition is false, the systems/methods repeat the scan for each entry until the above condition becomes true for next successive n entries.

When the condition is true, operations proceed to block 218, where the systems/methods assign the value of inbound_count of the PSM entry for which the condition was satisfied to the variable last_value. This marks the boundary of the service ports from the PSM.

Next, the systems/methods compute the estimated accuracy, expressed as a percentage (%), of each entry in the PSM (block 220). An estimated accuracy of the entries can be calculated using the following equation:

$$\text{PSM\_Accuracy} = (\text{inbound\_count} - \text{last\_value})/\text{inbound\_count} * 100 (\%) \qquad [2]$$

For the example shown above, a portion of the resulting PSM is shown in Table 4.

TABLE 4

PSM with last_value and PSM accuracy calculations

| dest_ip | dest_port | protocol | inbound_count | inbound_diff | Last_Value | PSM_Accuracy |
|---|---|---|---|---|---|---|
| 10.144.6.33 | 135 | 6 | 191 | 129 | 14 | 93% |
| 10.144.6.33 | 137 | 17 | 62 | 14 | 14 | 77% |
| 10.144.6.33 | 0 | 1 | 48 | 0 | 14 | 71% |
| 10.144.6.33 | 46282 | 6 | 48 | 2 | 14 | 71% |
| 10.144.6.33 | 161 | 17 | 46 | 9 | 14 | 70% |
| 10.144.6.33 | 48000 | 6 | 37 | 23 | 14 | 62% |
| 10.144.6.33 | 49602 | 6 | 14 | 0 | 14 | 0% |
| 10.144.6.33 | 49256 | 6 | 14 | 0 | 14 | 0% |
| 10.144.6.33 | 51774 | 6 | 14 | 0 | 14 | 0% |
| 10.144.6.33 | 57274 | 6 | 14 | 0 | 14 | 0% |
| 10.144.6.33 | 51428 | 6 | 14 | 2 | 14 | 0% |
| 10.144.6.33 | 41444 | 6 | 12 | 0 | 14 | −17% |
| 10.144.6.33 | 43340 | 6 | 12 | 0 | 14 | −17% |

TABLE 4-continued

PSM with last_value and PSM accuracy calculations

| dest_ip | dest_port | protocol | inbound_count | inbound_diff | Last_Value | PSM_Accuracy |
|---|---|---|---|---|---|---|
| 10.144.6.33 | 43686 | 6 | 12 | 0 | 14 | −17% |
| 10.144.6.33 | 59296 | 6 | 12 | 0 | 14 | −17% |
| 10.144.6.33 | 58950 | 6 | 12 | 1 | 14 | −17% |
| 10.144.6.33 | 45822 | 6 | 11 | 0 | 14 | −27% |
| 10.144.6.33 | 41790 | 6 | 11 | 0 | 14 | −27% |
| 10.144.6.33 | 47630 | 6 | 11 | 0 | 14 | −27% |
| 10.144.6.33 | 55456 | 6 | 11 | 0 | 14 | −27% |
| 10.144.6.33 | 55110 | 6 | 11 | 0 | 14 | −27% |
| 10.144.6.33 | 57620 | 6 | 11 | 11 | 14 | −27% |

Figure 5:
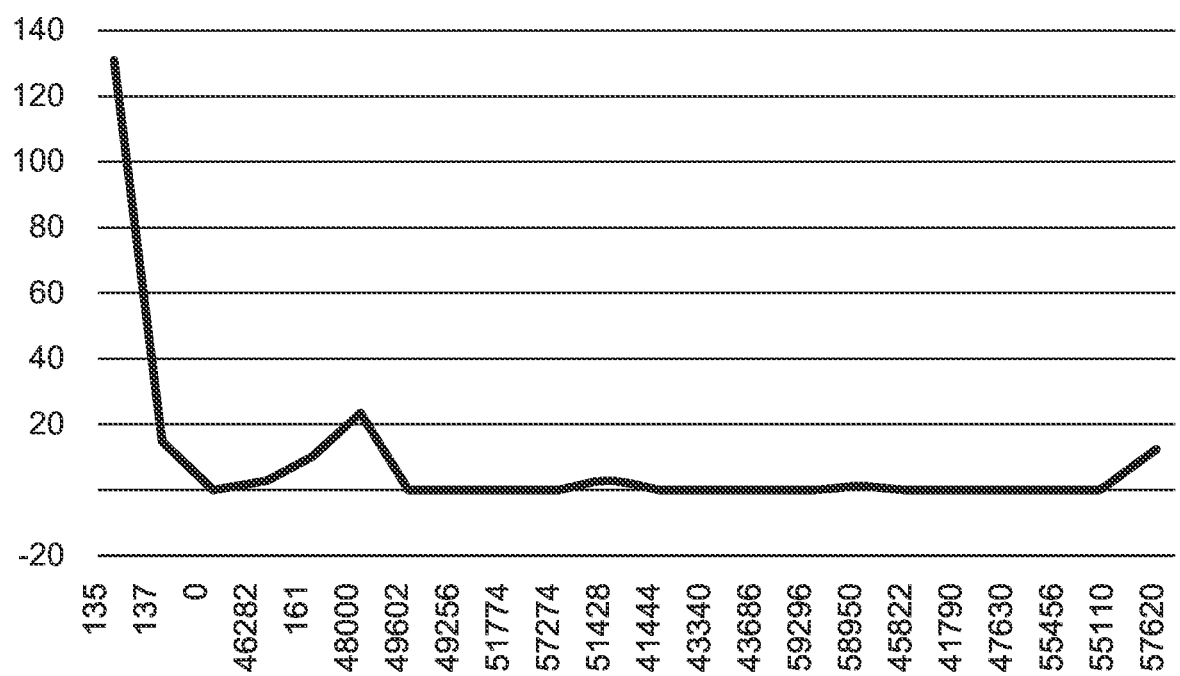
FIG. 5 is a graph that illustrates operations of port service map generation using a differentiation method according to some embodiments.

FIG. 5 is a plot of inbound_diff by destination port for destination IP 10.144.6.33 based on the values shown in Table 4. As shown in Table 4, applying the operations illustrated in FIG. 4 results in a value for last_value of 14 when n=3. In particular, the condition of inbound_diff<=min_count is not met for all of the first group of three entries (ports 135, 137 and 0), nor is it met for all of the second three entries (ports 46282, 161 and 48000). However, the condition is met for the next group of three entries, beginning with port 49602. For that port, the variable inbound_count has a value of 14. Thus, the value of last_value is set at 14. An estimated accuracy value (PSM_Accuracy) for each entry determined based on equation [2] is also shown in Table 4.

For the example shown in Table 4, security recommendations may be generated corresponding to the first six entries in the PSM, each of which has an estimated accuracy greater than zero. Security recommendations are generated by scanning the port traffic log for entries that match the destination IP address and port combinations identified above and then adding a security recommendation for each entry corresponding to the source IP address, destination IP address and destination port of the entry. Thus, in the example shown in Table 4, some example security recommendations that may be added (expressed as tuples of {source IP address, destination IP address, destination port}) are:

{10.44.68.10, 10.144.6.33, 135}
{10.44.69.70, 10.144.6.33, 137}
{10.44.79.110, 10.144.6.33, 46282}
{10.44.168.100, 10.144.6.33, 161}

Each of these security recommendations corresponds to an entry in the port traffic log that has a destination IP address and port that matches one of the first six entries in the PSM shown in Table 4.

Figure 6:
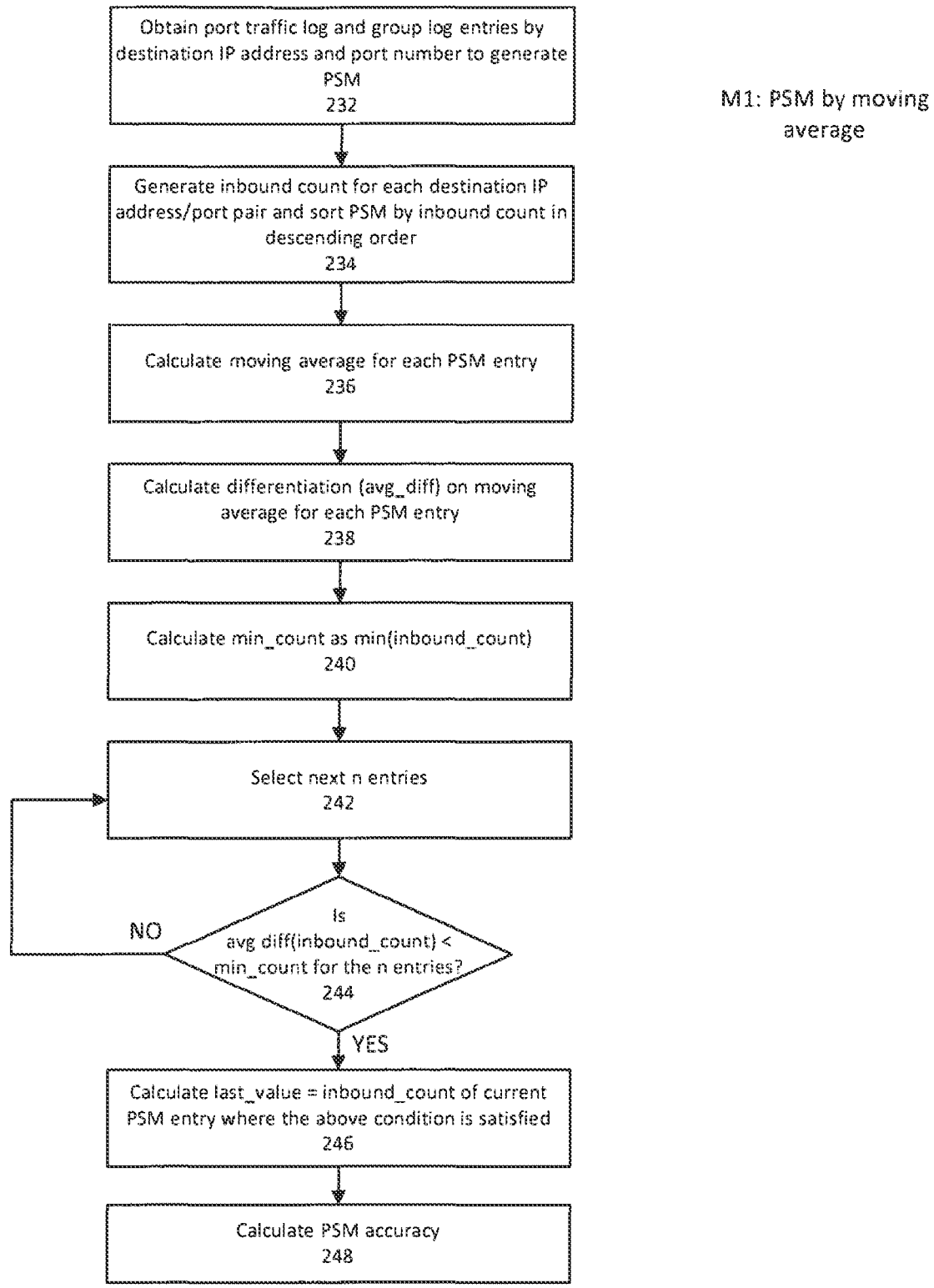
FIG. 6 is a flowchart that illustrates the generation of a port service map according to further embodiments.

FIG. 6 illustrates operations for generating a port service map using a moving average method. Referring to FIG. 6, systems/methods according to some embodiments may generate a PSM by first obtaining a port traffic log and grouping the log entries by destination IP address and port number (block 232). The systems/methods then generate an inbound count for each destination IP address/port and sorts the PSM by inbound_count in descending order (block 234). This results in a PSM similar to the one shown in Table 3 above. For each destination IP/port, the systems/methods then calculate a moving average for each entry in the PSM (block 236). The moving average of the $i^{th}$ entry (moving_average$_i$) may be calculated as:

$$\text{moving\_average}_i = \text{sum of inbound\_count/total inbound ports} \quad [3]$$

for all entries excluding all previous entries. That is, to calculate the value of moving_average for the $i^{th}$ entry, the quantity inbound_count/total_inbound_ports may be calculated for entries from i to n, where n is the total number of entries. This may be expressed mathematically as:

$$\text{moving\_average}_i = \sum_{i=1}^{n} \frac{\text{inbound\_count}}{(n-i+1)} \quad [4]$$

Next, for each combination of destination IP address and destination ports, the systems/methods compute a differentiation of moving_average (block 238) as follows. First, the smallest value of inbound_count is defined as min_count (block 240). The differentiation of moving_average for each entry in the PSM can be generated by subtracting the value of moving_average for the next succeeding entry from the value of moving_average of each entry. The differentiation may be denoted avg_diff.

For each combination of destination IP address and destination port, the systems/methods then compute the last_value as the value of moving_average at the boundary of the service ports in the map. The last_value can be computed as follows:

The systems/methods scan the values of moving_average of the next n entries (block 242), where n is selected as a positive integer having a value of one or more. The value of n determines the tradeoff between the false positive and true recommendation. It has been empirically found that a value of n=3 provides a good tradeoff.

Next, the systems/methods check to see if the condition avg_diff<=min_count is met for each of the next n entries (block 244).

These operations are repeated for each entry until the above condition becomes true for next n entries, at which point the value of inbound_count of the entry at which the condition is true is set as the value of last_value (block 246). This marks the boundary of the service ports from the PSM.

Finally, the systems/methods compute an estimated accuracy (expressed as a percentage %) of each entry in the PSM with the following equation (block 248):

$$\text{PSM\_Accuracy}=(\text{inbound\_count}-\text{last\_value})/\text{inbound\_count}*100 \quad [5]$$

For the example shown above, a portion of the resulting PSM is shown in Table 5, in which min_count=1.

TABLE 5

PSM generated using moving average methods

| dest_ip | dest_port | protocol | inbound_count | Moving_Average | Avg_Diff | Last_Value | PSM_Accuracy |
|---|---|---|---|---|---|---|---|
| 10.144.6.33 | 135 | 6 | 191 | 28.54545455 | 7.73593074 | 14 | 93% |
| 10.144.6.33 | 137 | 17 | 62 | 20.80952381 | 2.05952381 | 14 | 77% |
| 10.144.6.33 | 0 | 1 | 48 | 18.75 | 1.53947368 | 14 | 71% |
| 10.144.6.33 | 46282 | 6 | 48 | 17.21052632 | 1.71052632 | 14 | 71% |
| 10.144.6.33 | 161 | 17 | 46 | 15.5 | 1.79411765 | 14 | 70% |
| 10.144.6.33 | 48000 | 6 | 37 | 13.70588235 | 1.45588235 | 14 | 62% |
| 10.144.6.33 | 49602 | 6 | 14 | 12.25 | 0.11666667 | 14 | 0% |
| 10.144.6.33 | 49256 | 6 | 14 | 12.13333333 | 0.13333333 | 14 | 0% |
| 10.144.6.33 | 51774 | 6 | 14 | 12 | 0.15384615 | 14 | 0% |
| 10.144.6.33 | 57274 | 6 | 14 | 11.84615385 | 0.17948718 | 14 | 0% |
| 10.144.6.33 | 51428 | 6 | 14 | 11.66666667 | 0.21212121 | 14 | 0% |
| 10.144.6.33 | 41444 | 6 | 12 | 11.45454545 | 0.05454545 | 14 | −17% |
| 10.144.6.33 | 43340 | 6 | 12 | 11.4 | 0.06666667 | 14 | −17% |
| 10.144.6.33 | 43686 | 6 | 12 | 11.33333333 | 0.08333333 | 14 | −17% |
| 10.144.6.33 | 59296 | 6 | 12 | 11.25 | 0.10714286 | 14 | −17% |
| 10.144.6.33 | 58950 | 6 | 12 | 11.14285714 | 0.14285714 | 14 | −17% |
| 10.144.6.33 | 45822 | 6 | 11 | 11 | 0 | 14 | −27% |
| 10.144.6.33 | 41790 | 6 | 11 | 11 | 0 | 14 | −27% |
| 10.144.6.33 | 47630 | 6 | 11 | 11 | 0 | 14 | −27% |
| 10.144.6.33 | 55456 | 6 | 11 | 11 | 0 | 14 | −27% |
| 10.144.6.33 | 55110 | 6 | 11 | 11 | 0 | 14 | −27% |
| 10.144.6.33 | 57620 | 6 | 11 | 11 | 11 | 14 | −27% |

In the example illustrated in Table 5, the value of last_value is set at 14, because min_count is equal to 1.

Figure 7:
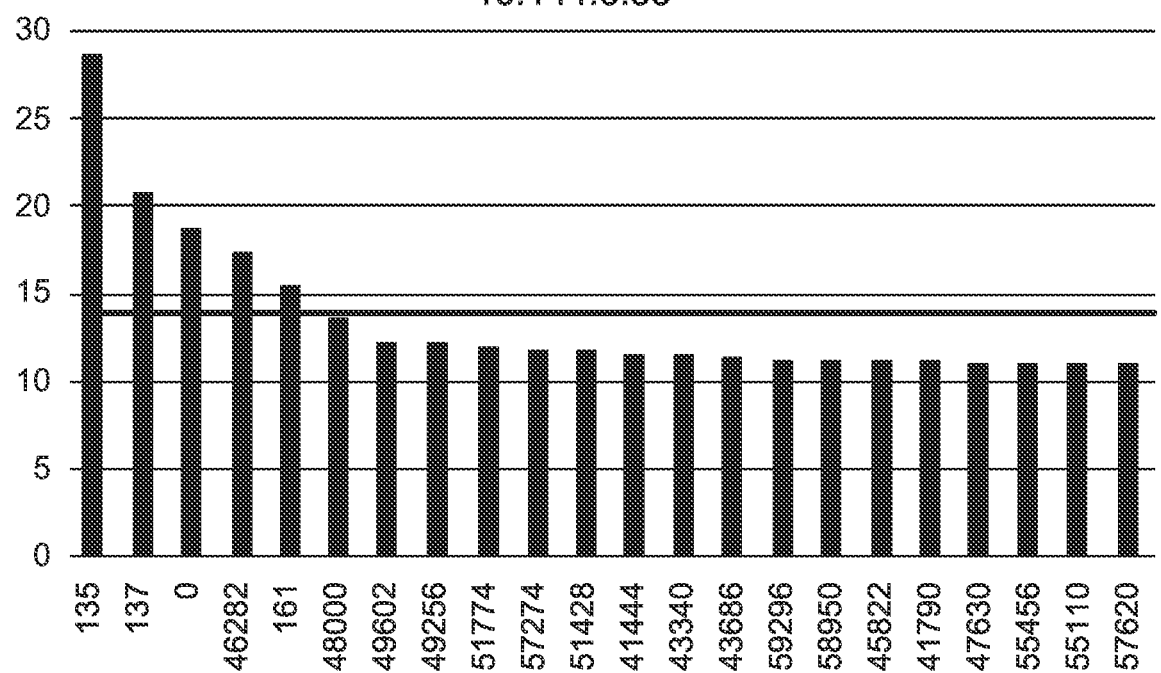
FIG. 7 is a graph that illustrates operations of port service map generation using a moving average method according to some embodiments.

FIG. 7 is a plot of moving_average by destination port for IP address 10.144.6.33. Once the PSM has been generated, security recommendations can be extracted from the log file using the PSM as described above.

Figure 10:
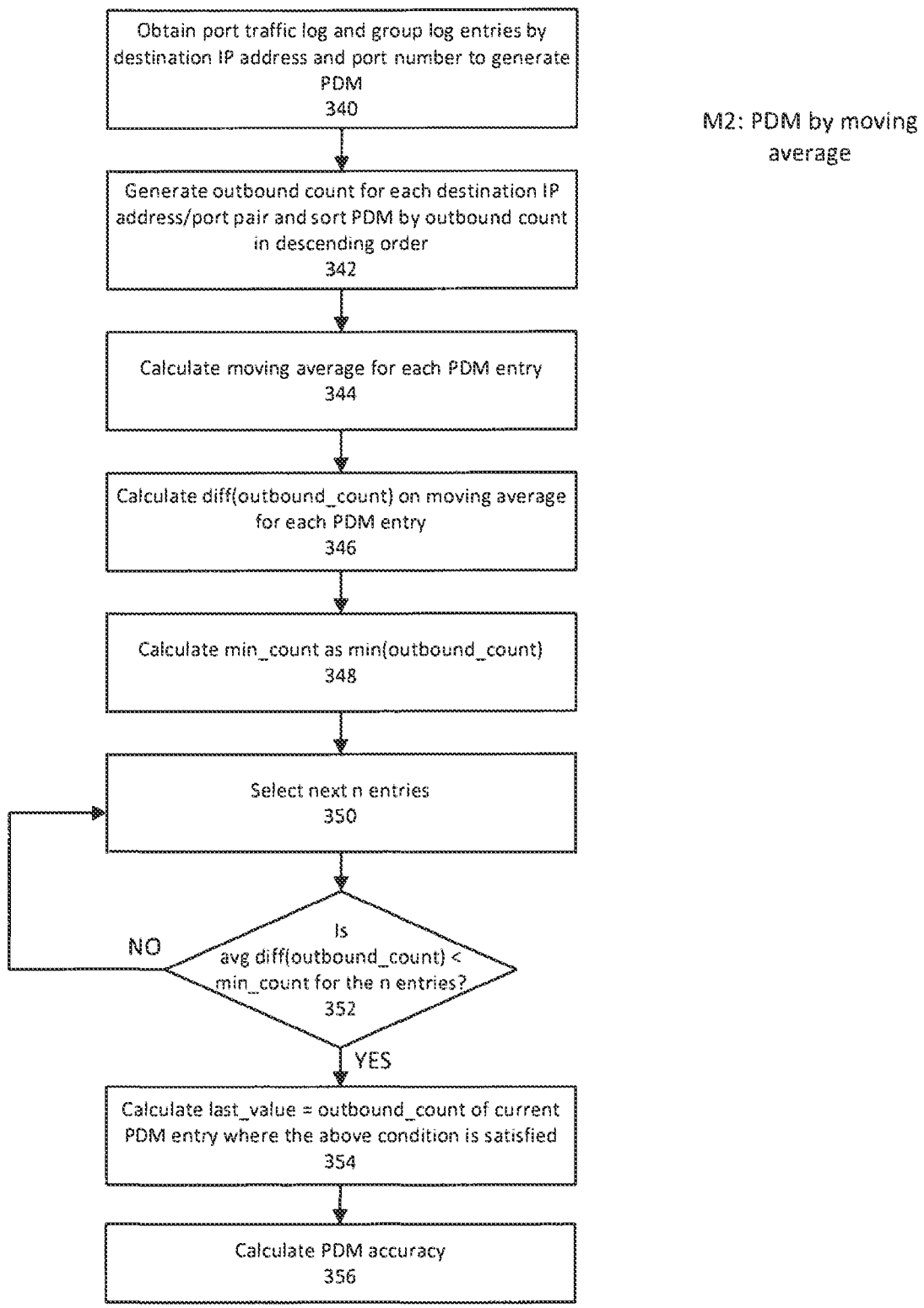
FIG. 10 is a flowchart that illustrates the generation of a port distribution map according to further embodiments.

Brief reference is made again to FIG. 3A. As shown therein, in block 104, to reduce the number of false positives in the recommendation list, a port distribution map (PDM) may be generated and used to validate the recommendation list by marking or eliminating false positive entries from the recommendation list. The generation of a port distribution list according to various embodiments is illustrated in FIGS. 8 and 10, and the use of the PDM to eliminate false positive security recommendations is illustrated in FIGS. 12A to 12D.

Figure 8:
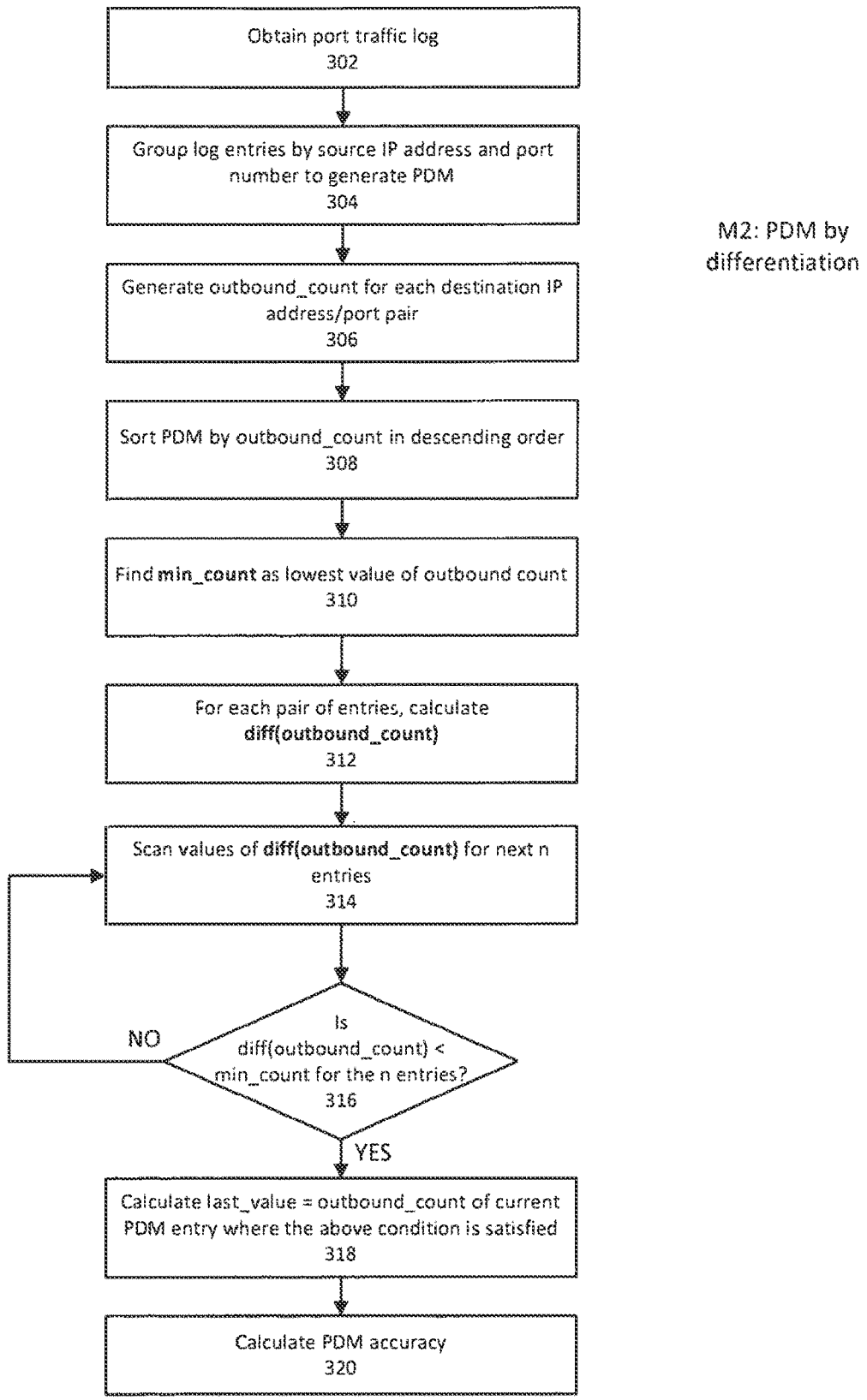
FIG. 8 is a flowchart that illustrates the generation of a port distribution map according to some embodiments.

Referring to FIG. 8, a port distribution map (PDM) may be generated using a differentiation method according to some embodiments by first obtaining a port traffic log (block 302). As described above, a PDM is a map of number of outbound connections from each source port in a given reference period per server.

Table 6 is an example of a portion of a raw log file that may be used to generate a PDM.

TABLE 6

Raw Port Traffic Log

| src_ip | src_port | dest_ip | dest_port | protocol |
|---|---|---|---|---|
| 10.145.70.164 | 58876 | 10.145.197.160 | 48001 | 6 |
| 10.145.197.160 | 48001 | 10.145.70.164 | 58887 | 6 |
| 10.145.70.164 | 49900 | 10.145.197.160 | 48002 | 6 |
| 10.145.197.160 | 48002 | 10.145.70.164 | 49900 | 6 |
| 10.145.197.160 | 48001 | 10.145.70.164 | 58876 | 6 |
| 10.145.70.164 | 49915 | 10.145.197.160 | 48002 | 6 |
| 10.145.70.164 | 49929 | 10.145.197.160 | 48002 | 6 |
| 10.144.70.29 | 443 | 10.145.70.164 | 54651 | 6 |
| 10.145.197.160 | 48001 | 10.145.70.164 | 58916 | 6 |
| 10.145.68.10 | 53 | 10.145.70.164 | 41702 | 17 |
| 10.145.70.164 | 49971 | 10.145.197.160 | 48002 | 6 |
| 10.145.197.160 | 48001 | 10.145.70.164 | 58976 | 6 |
| 10.145.197.160 | 48001 | 10.145.70.164 | 58992 | 6 |

TABLE 6-continued

Raw Port Traffic Log

| src_ip | src_port | dest_ip | dest_port | protocol |
|---|---|---|---|---|
| 10.145.70.164 | 48000 | 10.144.71.185 | 55636 | 6 |
| 10.145.197.160 | 48002 | 10.145.70.164 | 49993 | 6 |
| 10.144.71.185 | 55636 | 10.145.70.164 | 48000 | 6 |
| 10.145.70.164 | 38168 | 10.145.196.10 | 53 | 17 |
| 10.145.70.164 | 50009 | 10.145.197.160 | 48002 | 6 |
| 10.145.197.160 | 48001 | 10.145.70.164 | 59023 | 6 |
| 10.144.5.161 | 7163 | 10.145.70.164 | 50028 | 6 |
| 10.145.203.151 | 16999 | 10.145.198.12 | 53649 | 6 |
| 10.145.70.130 | 15999 | 10.145.203.151 | 53735 | 6 |
| 10.145.203.151 | 53783 | 10.145.70.130 | 15999 | 6 |
| 10.145.203.151 | 53773 | 10.145.70.130 | 15999 | 6 |

The port traffic log is grouped by source IP address, source port and protocol (block 304), and a value of outbound_count is generated for each source IP address/port pair (block 306). The PDM is then sorted in the descending order of outbound_count (block 308).

Table 7 is an example of a portion of a PDM with log entries for source IP address 10.144.5.161 that has been sorted by outbound_count in descending order.

TABLE 7

Log entries sorted by source IP address and port

| source_ip | source_port | protocol | outbound_count |
|---|---|---|---|
| 10.144.5.161 | 3306 | 6 | 2865 |
| 10.144.5.161 | 123 | 17 | 652 |
| 10.144.5.161 | 4105 | 6 | 278 |
| 10.144.5.161 | 7163 | 6 | 254 |
| 10.144.5.161 | 60188 | 6 | 151 |
| 10.144.5.161 | 33292 | 17 | 143 |
| 10.144.5.161 | 80 | 6 | 121 |
| 10.144.5.161 | 48000 | 6 | 104 |
| 10.144.5.161 | 22 | 6 | 91 |
| 10.144.5.161 | 37080 | 6 | 34 |
| 10.144.5.161 | 52932 | 6 | 30 |
| 10.144.5.161 | 60662 | 6 | 29 |
| 10.144.5.161 | 49122 | 6 | 28 |
| 10.144.5.161 | 33006 | 6 | 27 |
| 10.144.5.161 | 44588 | 6 | 27 |

TABLE 7-continued

Log entries sorted by source IP address and port

| source_ip | source_port | protocol | outbound_count |
|---|---|---|---|
| 10.144.5.161 | 37062 | 6 | 26 |
| 10.144.5.161 | 37106 | 6 | 26 |
| 10.144.5.161 | 56980 | 6 | 26 |
| 10.144.5.161 | 55744 | 6 | 26 |
| 10.144.5.161 | 59026 | 6 | 25 |

Then, for each combination of source IP address and source ports, the following operations are performed. First, min_count is defined as the lowest value of outbound_count in the list (block 310).

The systems/methods then calculate a differentiation on outbound_count for each entry in the PDM (block 312). This can be achieved by subtracting the outbound_count of each row from the outbound_count of the preceding row. The differentiation is denoted outbound_diff.

The systems/methods then scan the values of outbound_diff of next n entries, where n>=1 (block 314). The value of n determines a tradeoff between the false positive and true recommendations. It has been empirically determined that n=3 provides a good tradeoff.

The systems/methods then check the condition of outbound_diff<=min_count for the next n entries (block 316). This check is repeated for each entry until the above condition becomes true for the next n entries.

Once the condition has been satisfied, the systems/methods assign the value of outbound_count for the entry at which the condition is satisfied to the variable last_value, where the last_value represents the value of outbound_count at the boundary of the recommended ports in the PDM (block 318).

Finally, the systems/methods compute the estimated accuracy (expressed as a percentage %) of each entry in the PDM (block 320). The estimated accuracy may be calculated using the following equation:

$$PDM\_Accuracy=(outbound\_count-last\_value)/outbound\_count*100 \quad [6]$$

Figure 9:
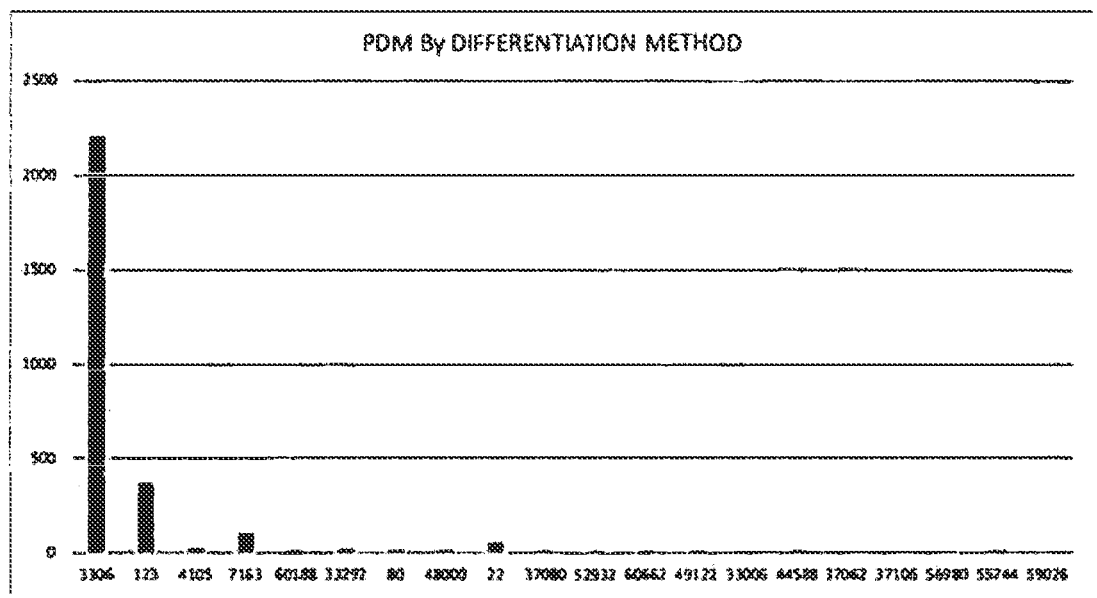
FIG. 9 is a graph that illustrates operations of port distribution map generation using a differentiation method according to some embodiments.

Table 8 is an example of a PDM based on the data of Table 7 and for which a last value of 30 has been determined. FIG. 9 is a graph of outbound_diff by source port for the above example. In this example, min_count is equal to 1. The value of outbound_diff is less than min_count for three successive rows when outbound_count is equal to 30.

TABLE 8

PDM for Source IP address 10.144.5.161 Generated Using Differentiation

| source_ip | source_port | protocol | outbound_count | outbound_diff | last_value | accuracy |
|---|---|---|---|---|---|---|
| 10.144.5.161 | 3306 | 6 | 2865 | 2213 | 30 | 99% |
| 10.144.5.161 | 123 | 17 | 652 | 374 | 30 | 95% |
| 10.144.5.161 | 4105 | 6 | 278 | 24 | 30 | 89% |
| 10.144.5.161 | 7163 | 6 | 254 | 103 | 30 | 88% |
| 10.144.5.161 | 60188 | 6 | 151 | 8 | 30 | 80% |
| 10.144.5.161 | 33292 | 17 | 143 | 22 | 30 | 79% |
| 10.144.5.161 | 80 | 6 | 121 | 17 | 30 | 75% |
| 10.144.5.161 | 48000 | 6 | 104 | 13 | 30 | 71% |
| 10.144.5.161 | 22 | 6 | 91 | 57 | 30 | 67% |
| 10.144.5.161 | 37080 | 6 | 34 | 4 | 30 | 12% |
| 10.144.5.161 | 52932 | 6 | 30 | 1 | 30 | 0% |
| 10.144.5.161 | 60662 | 6 | 29 | 1 | 30 | -3% |
| 10.144.5.161 | 49122 | 6 | 28 | 1 | 30 | -7% |
| 10.144.5.161 | 33006 | 6 | 27 | 0 | 30 | -11% |
| 10.144.5.161 | 44588 | 6 | 27 | 1 | 30 | -11% |
| 10.144.5.161 | 37062 | 6 | 26 | 0 | 30 | -15% |
| 10.144.5.161 | 37106 | 6 | 26 | 0 | 30 | -15% |
| 10.144.5.161 | 56980 | 6 | 26 | 0 | 30 | -15% |
| 10.144.5.161 | 55744 | 0 | 26 | 1 | 30 | -15% |
| 10.144.5.161 | 59026 | 6 | 25 | 0 | 30 | -20% |

FIG. 10 illustrates operations for generating a port distribution map using a moving average method. Referring to FIG. 10, systems/methods according to some embodiments may generate a PDM by first obtaining a port traffic log and grouping the log entries by source IP address and port number (block 340). The systems/methods then generate an outbound count for each source IP address/port and sorts the PDM by outbound_count in descending order (block 342). This results in a PDM similar to the one shown in Table 7 above. For each source IP/port, the systems/methods then calculate a moving average for each entry in the PDM (block 344). The moving average of the $i^{th}$ entry (moving_average$_i$) may be calculated as:

$$moving\_average_i = sum\ of\ outbound\_count/total\ outbound\ ports \quad [7]$$

for all entries excluding all previous entries. That is, to calculate the value of moving_average for the $i^{th}$ entry, the quantity outbound_count/total_outbound_ports is calculated for entries from i to n, where n is the total number of entries. This may be expressed mathematically as:

$$moving\_average_i = \sum_{i=1}^{n} \frac{outbound\_count}{(n-i+1)} \quad [8]$$

Next, for each combination of source IP address and source ports, the systems/methods compute a differentiation of moving_average (block 346) as follows. First, the smallest value of outbound_count is defined as min_count (block 348). The differentiation on moving_average for each entry in the PDM can be generated by subtracting the value of moving_average for the next succeeding entry from the value of moving_average of each entry. The differentiation may be denoted avg_diff.

For each combination of source IP address and source port, the systems/methods then compute the last_value as the value of moving_average at the boundary of the service ports in the map. The last_value can be computed as follows:

The systems/methods scan the values of moving_average of the next n entries (block 350), where n is a value greater than one. The value of n determines the tradeoff between the false positive and true recommendation. It has been empirically found that a value of n=3 provides a good tradeoff.

Next, the systems/methods check to see if the condition avg_diff<=min_count is met for each of the next n entries (block 352).

These operations are repeated for each entry until the above condition becomes true for next n entries, at which point the value of outbound_count of the entry at which the condition is true is set as the value of last_value (block 354). This marks the boundary of the service ports from the PDM.

Finally, the systems/methods compute an estimated accuracy (expressed as a percentage %) of each entry in the PDM with the following equation (block 356):

$$PDM\_Accuracy = (outbound\_count - last\_value)/outbound\_count * 100 \quad [9]$$

Figure 11:
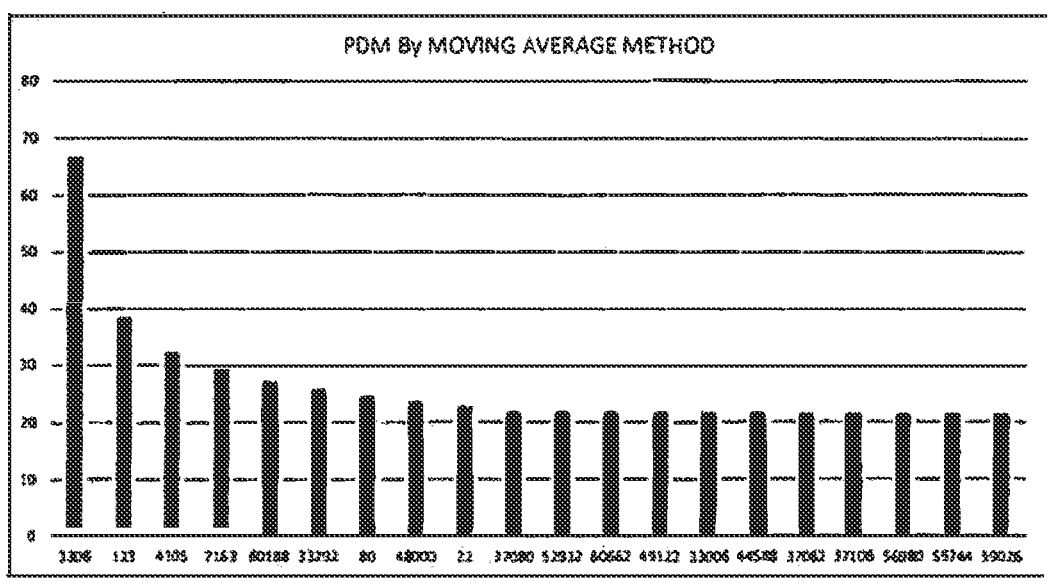
FIG. 11 is a graph that illustrates operations of port distribution map generation using a moving average method according to some embodiments.

For the example shown above, the resulting PDM is shown in Table 9. FIG. 11 is a graph of moving average for each source port for the data shown in Table 9. In this example, min_count is equal to 1. The value of avg_diff is less than min_count for three successive rows when outbound_count is equal to 104.

sequentially select each record in the Port Traffic Log (block 362). For the selected log record, the systems methods find the corresponding entry in the PSM that has the same destination IP address/port as the selected log record (block 364). The systems/methods then examine the value of PSM_Accuracy in the PSM entry corresponding to the destination IP address and destination port of the log record (block 366). If the PSM_Accuracy in the PSM entry is greater than 0% for the destination IP address (dest_ip) and destination port (dest_port) for the log record, then a tuple consisting of {sourceIP, destinationIP, destinationPort} from the selected record is added as recommendation to a REC-OMMENDATIONS_LIST (block 368). If the PSM_Accuracy is not greater than zero, then operations return to block 362 to select the next log record.

The PSM_Accuracy for the PSM entry is added as estimated accuracy for this recommendation (block 370). These recommendations may be verified as described below using the PDM. The systems/methods then check at block 372 to see if there are any additional log records in the Port Traffic Log to analyze. If so, the operations return to block 362 to select the next log record in the Port Traffic Log. Otherwise, operations terminate.

Some embodiments may use the PDM to identify false positive entries in the RECOMMENDATIONS_LIST generated using the PSM as follows. Referring to FIG. 12B, starting with the PDM and the RECOMMENDATIONS_LIST generated based on the PSM (block 351), the systems/methods may select an entry in the RECOMMENDATIONS_LIST (block 353). The systems/methods then find the corresponding entry in the PDM (block 355) and determine if the PDM_Accuracy in the PDM entry is greater than 0% (block 357). If so, then operations return to block

TABLE 9

PDM for Source IP address 10.144.5.161 Generated Using Moving Average Method

| source_ip | source_port | protocol | outbound_count | moving_average | avg_diff | last_value | accuracy |
|---|---|---|---|---|---|---|---|
| 10.144.5.161 | 3306 | 6 | 2865 | 66.78 | 28.2648485 | 104 | 96% |
| 10.144.5.161 | 123 | 17 | 652 | 38.5151515 | 6.26004947 | 104 | 84% |
| 10.144.5.161 | 4105 | 6 | 278 | 32.255102 | 2.53345256 | 104 | 63% |
| 10.144.5.161 | 7163 | 6 | 254 | 29.7216495 | 2.33623282 | 104 | 59% |
| 10.144.5.161 | 60188 | 6 | 151 | 27.3854167 | 1.30120614 | 104 | 31% |
| 10.144.5.161 | 33292 | 17 | 143 | 26.0842105 | 1.24378499 | 104 | 27% |
| 10.144.5.161 | 80 | 6 | 121 | 24.8404255 | 1.03397392 | 104 | 14% |
| 10.144.5.161 | 48000 | 6 | 104 | 23.8064516 | 0.871669 | 104 | 0% |
| 10.144.5.161 | 22 | 6 | 91 | 22.9347826 | 0.74796942 | 104 | −14% |
| 10.144.5.161 | 37080 | 6 | 34 | 22.1868132 | 0.13125763 | 104 | −206% |
| 10.144.5.161 | 52932 | 6 | 30 | 22.0555556 | 0.08926342 | 104 | −247% |
| 10.144.5.161 | 60662 | 6 | 29 | 21.9662921 | 0.0799285 | 104 | −259% |
| 10.144.5.161 | 49122 | 6 | 28 | 21.8863636 | 0.07027168 | 104 | −271% |
| 10.144.5.161 | 33006 | 6 | 27 | 21.816092 | 0.060278 | 104 | −285% |
| 10.144.5.161 | 44588 | 6 | 27 | 21.755814 | 0.06169631 | 104 | −285% |
| 10.144.5.161 | 37062 | 6 | 26 | 21.6941176 | 0.0512605 | 104 | −300% |
| 10.144.5.161 | 37106 | 6 | 26 | 21.6428571 | 0.0524957 | 104 | −300% |
| 10.144.5.161 | 56980 | 6 | 26 | 21.5903614 | 0.05377608 | 104 | −300% |
| 10.144.5.161 | 55744 | 6 | 26 | 21.5365854 | 0.05510388 | 104 | −300% |
| 10.144.5.161 | 59026 | 6 | 25 | 21.4814815 | 0.04398148 | 104 | −316% |

Once the PDM and PSM have been generated as provided above, a set of security recommendations may be generated from which a security policy may be constructed. First, finding the recommendations and calculating the estimated accuracy using a PSM will be described in connection with FIG. 12A.

Figure 12A:
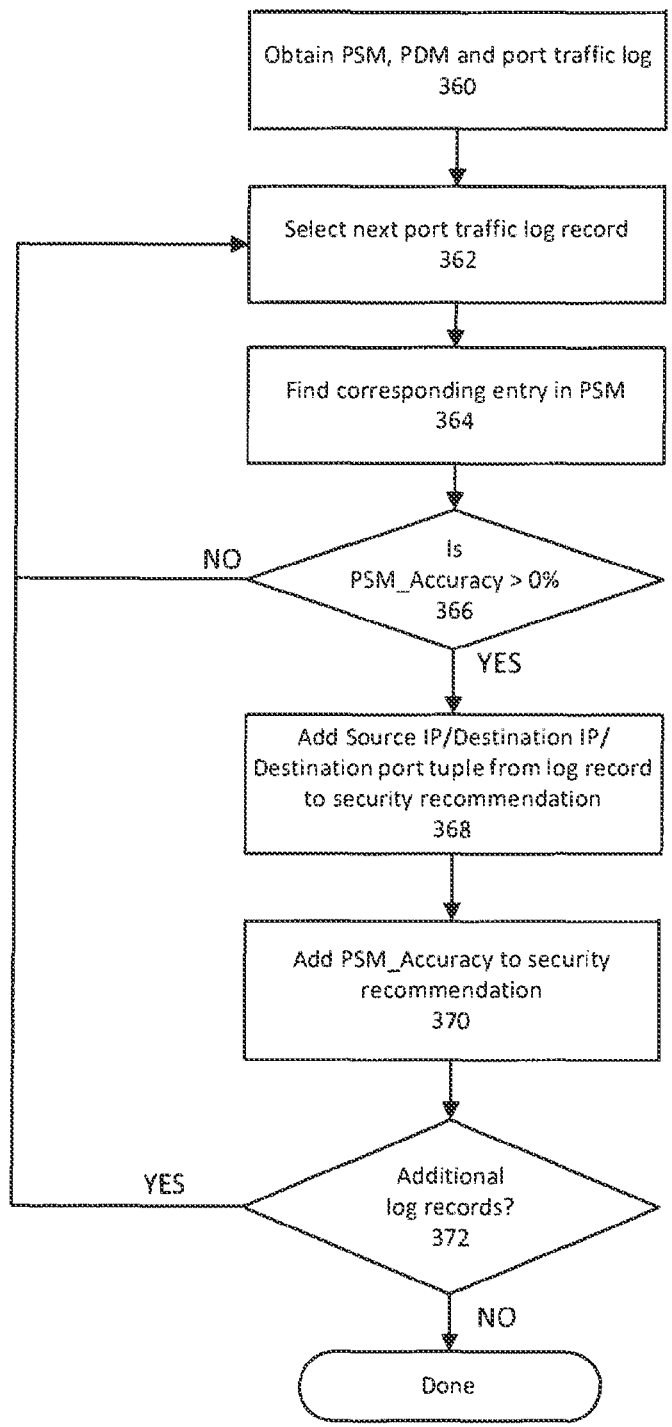
FIGS. 12A to 12D are flowcharts that illustrate operations of generating a validating a list of security policy recommendations according to some embodiments.
Figure 12B:
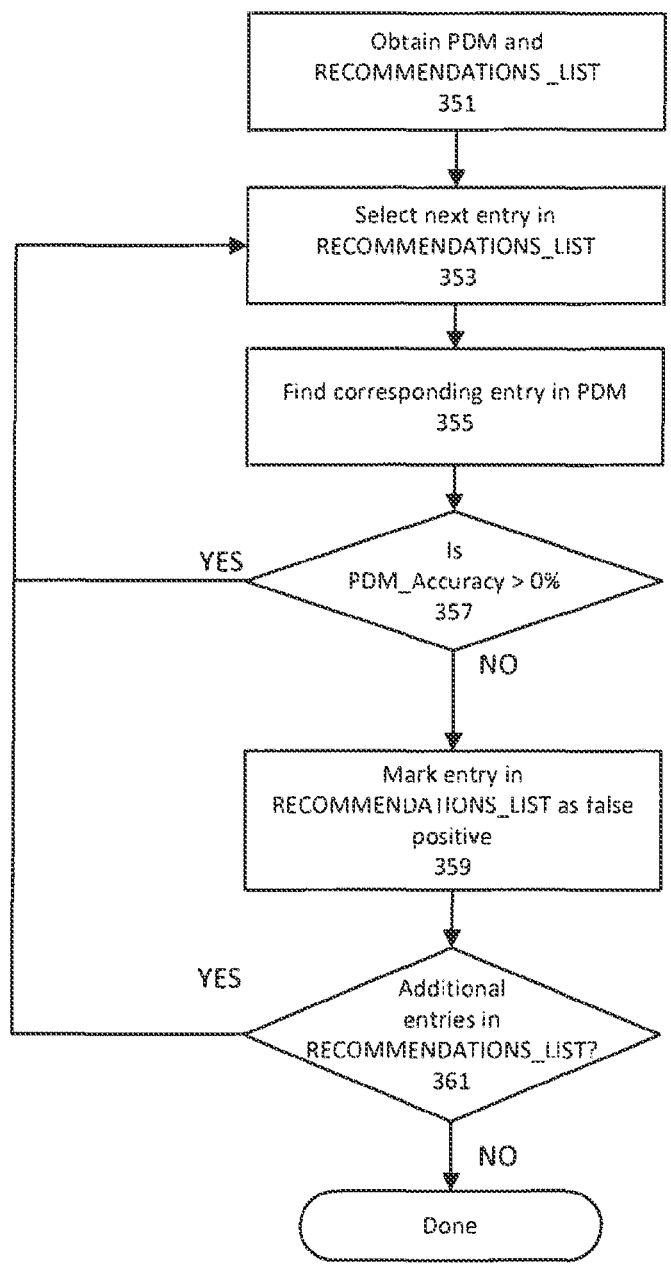

Referring to FIG. 12A, and starting with a PSM, such as the PSM shown in Table 4 or Table 5, and a Port Traffic Log as shown in Table 1 (block 360), the systems/methods 353 to select the next entry in the RECOMMENDATIONS_LIST. Otherwise, the selected entry in the RECOMMENDATIONS_LIST is marked as a "false positive" recommendation at block 359. The systems/methods then check at block 361 to see if there are any additional entries in the RECOMMENDATIONS_LIST to analyze. If so, operations return to block 353 to select the next entry in the RECOMMENDATIONS_LIST. Otherwise, operations terminate.

Figure 12C:
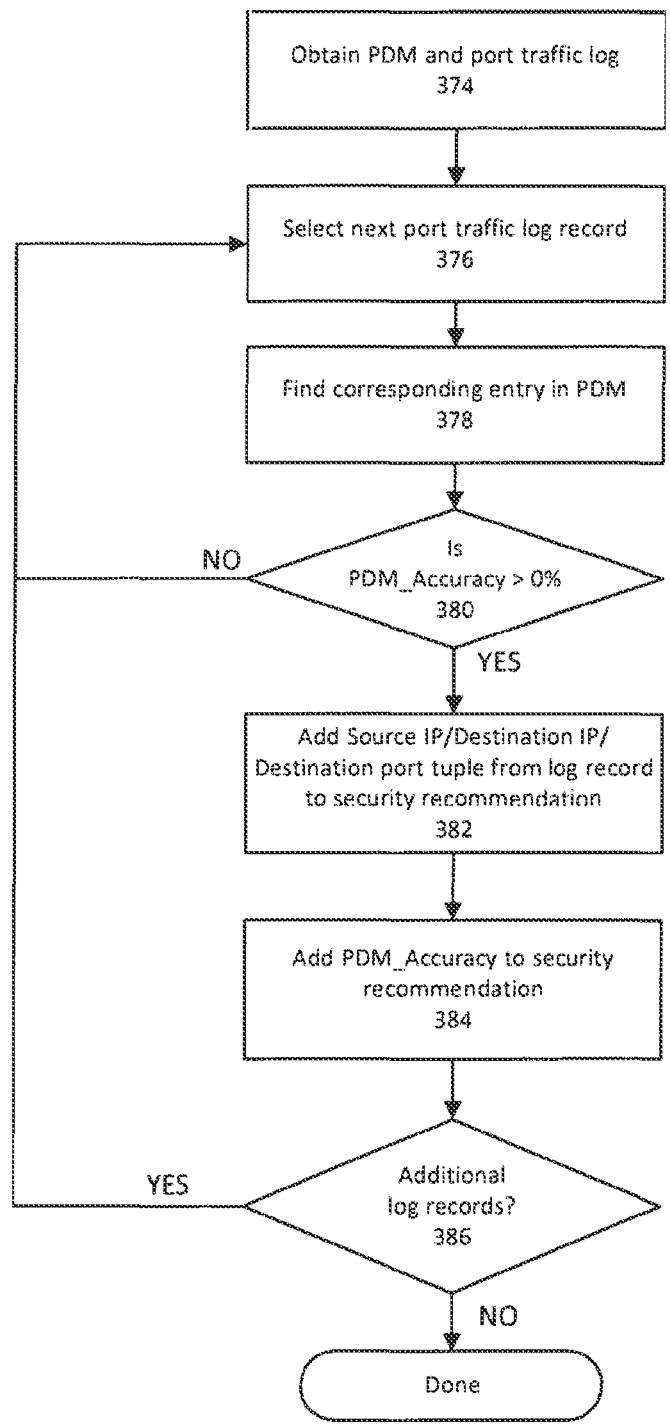

Recommendations can also be generated from the PDM as follows. Referring to FIG. 12C, and starting with a PDM, such as the PDM shown in Table 8 or Table 9, and a Port Traffic Log as shown in Table 1 (block 374), the systems/methods sequentially select each record in the Port Traffic Log (block 376). For the selected log record, the systems methods find the corresponding entry in the PDM that has the same source IP address/port as the selected log record (block 378). The systems/methods then examine the value of PDM_Accuracy in the PDM entry corresponding to the source IP address and destination port of the log record (block 380). If the PDM_Accuracy in the PDM entry is greater than 0% for the source IP address (source_ip) and source port (source_port) for the log record, then a tuple consisting of {sourceIP, destinationIP, destinationPort} from the selected record is added as recommendation to a RECOMMENDATIONS_LIST (block 382). If the PDM_Accuracy is not greater than zero percent, then operations return to block 376 to select the next log record.

The PDM_Accuracy for the PDM entry is added as the estimated accuracy for this recommendation (block 384). The systems/methods then check at block 386 to see if there are any additional log records in the Port Traffic Log to analyze. If so, the operations return to block 376 to select the next log record. Otherwise, operations terminate.

The RECOMMENDATIONS_LIST generated using the PDM in accordance with the operations of FIG. 12C can be checked for false positives using the PSM in a similar manner as shown above for the RECOMMENDATIONS_LIST generated using the PSM. That is, entries in the RECOMMENDATIONS_LIST generated using the PDM that have a PSM_Accuracy that is 0% or less can be marked as false positives.

Figure 12D:
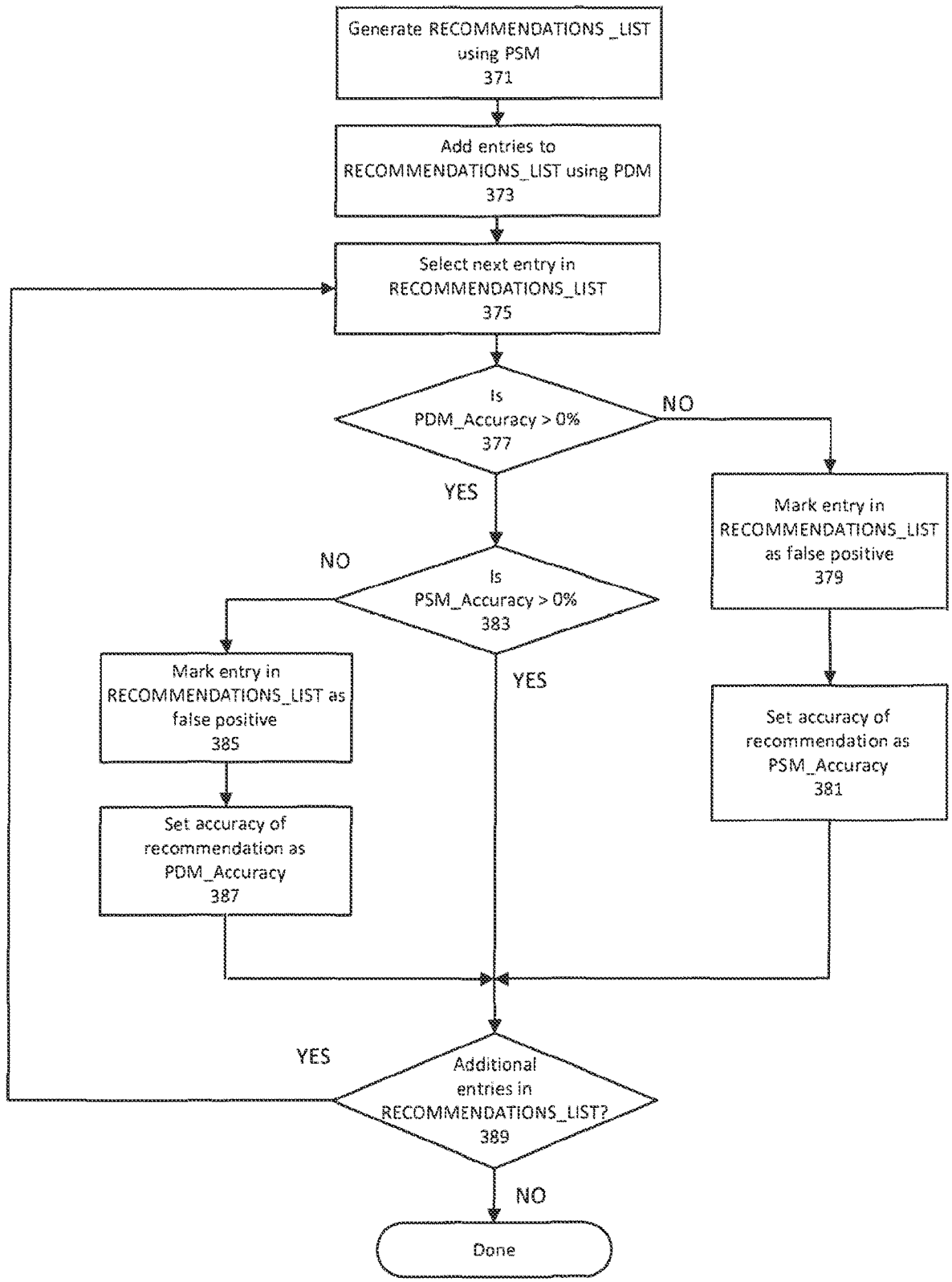

In some embodiments, a RECOMMENDATIONS_LIST can be generated using the operations shown in both FIGS. 12A and 12C, and then the resulting list can be checked against the PSM and PDM for false positives as shown in FIG. 12D. Referring to FIG. 12D, systems/methods according to some embodiments may generate a RECOMMENDATIONS_LIST using a PSM (block 371), such as by the operations of FIG. 12A, and add entries to the RECOMMENDATIONS_LIST using the PDM (block 373), such as by the operations of FIG. 12C. The systems/methods may select the next entry in the RECOMMENDATIONS_LIST (block 375) and determine if the PDM_Accuracy corresponding to the entry is greater than 0% (block 377). If not, the systems/methods may mark the entry as a false positive (block 379) and set the estimated accuracy of the entry equal to the PSM_Accuracy, which must be greater than 0% (block 381). Otherwise, operations proceed to block 383, where the systems/methods determine if the PSM_Accuracy corresponding to the entry is greater than 0%. If not, the systems/methods may mark the entry as a false positive (block 385) and set the estimated accuracy of the entry equal to the PDM_Accuracy, which must be greater than 0% (block 387). Finally, the systems/methods check to see if there are any more entries in the RECOMMENDATIONS_LIST to analyze (block 389). If so, operations return to block 375 to select the next entry in the RECOMMENDATIONS_LIST. Otherwise, operations terminate.

Once the RECOMMENDATIONS_LIST has been generated, a microsegmentation security policy can be created and implemented using the security policy recommendations in the RECOMMENDATIONS_LIST (see block 108 in FIG. 3A). The microsegmentation security policy may be generated by taking into account the security policy recommendations in the RECOMMENDATIONS_LIST along with information relating to the estimated accuracy of the recommendations and whether or not the recommendations are marked as false positive recommendations. For example, if a recommendation list entry has an estimated accuracy value of 80% or more, it is most likely a trustworthy entry and may be included in the microsegmentation security policy. However, if a recommendation list entry has an estimated accuracy value less than about 50%, then a system administrator may look more closely at the entry and/or obtain and analyze additional port traffic log data before including it in a microsegmentation policy.

Figure 13:
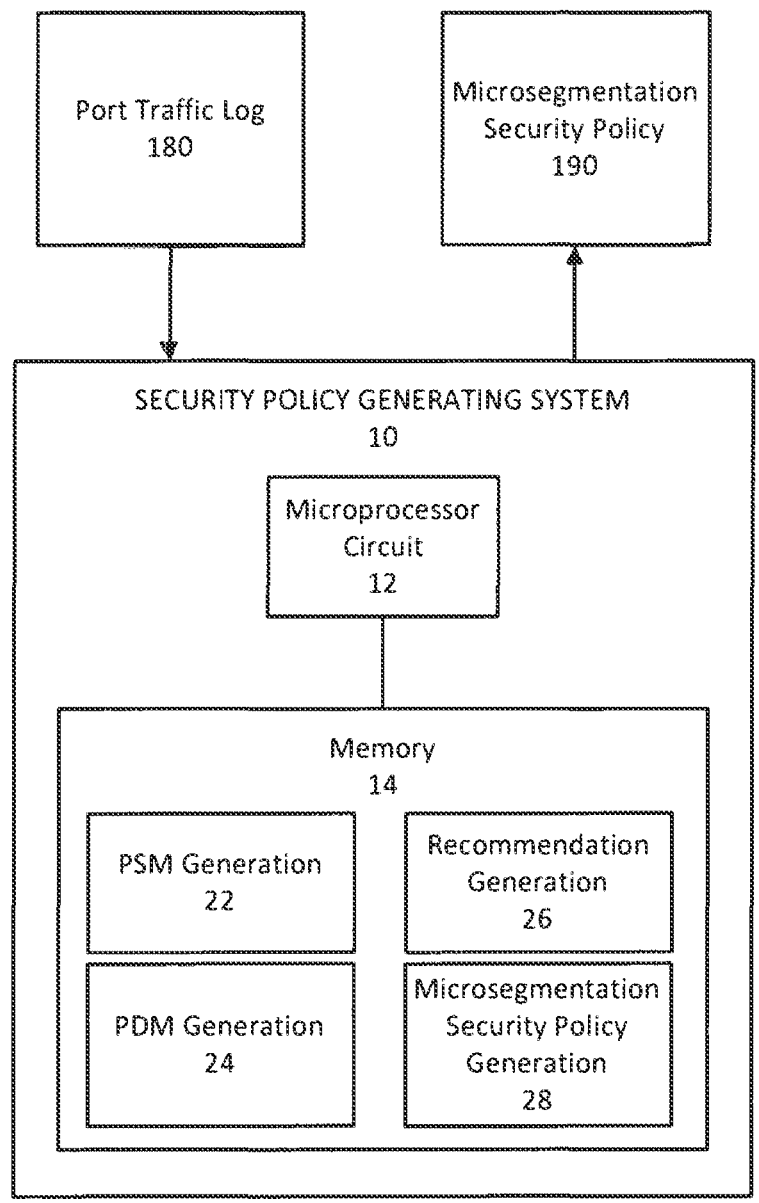
FIG. 13 is a schematic block diagram that illustrates a security policy generating system according to some embodiments.

Brief reference is made to FIG. 13, which is a schematic diagram of a security policy generating system 10 according to some embodiments. The security policy generating system 10 may be implemented using a computer processing system including a microprocessor circuit 12 and a memory 14 coupled to the microprocessor circuit 12. The memory 14 may include a plurality of functional modules that store computer-readable instructions for executing various of the operations described herein by the microprocessor circuit 12. For example, the memory 14 may include a PSM generation module 22 that configures the microprocessor circuit 12 to generate a PSM as described above with respect to FIGS. 4 and 6, a PDM generation module 24 that configures the microprocessor circuit 12 to generate a PSM as described above with respect to FIGS. 8 and 10, a recommendation generation module 26 that configures the microprocessor circuit 12 to generate a RECOMMENDATIONS_LIST as described above with respect to FIGS. 12A to 12D, and a microsegmentation security policy generation module 28 that configures the microprocessor circuit 12 to generate a microsegmentation security policy from the recommendations in the RECOMMENDATIONS_LIST. The security policy generation system 10 may accept a port traffic log 180 as an input and, using the systems/methods described herein, generate a microsegmentation security policy 190 as an output.

Some embodiments described herein for generating security policy recommendations from the port traffic logs may provide improved results compared to traditional methods, such as generating recommendations based on ephemeral ranges. Since the ephemeral range is configurable and there is no restriction for using them as service ports, it is possible to miss true recommendations with the ephemeral method. For example, a server configured with port 44443 could be mistakenly considered as an ephemeral port since this port is within the range of 32768 to 61000, i.e. the ephemeral range for Linux. Using the systems/methods described herein, however, this port may be identified for valid recommendations.

The systems/methods described herein may provide an improved list of security policy recommendations by building a service profile using a port service map and an ephemeral profile using a port distribution map for each server on each of the ports. Moreover, by generating an estimated accuracy for each recommendation, a better decision can be made as to whether to accept or to reconsider/reevaluate the recommendation using more data/log records. This may greatly reduce the amount of work needed to analyze the log records when designing security policies.

It will be appreciated that according to some embodiments, a PDM-based approach or a PSM-based approach may be employed to generate security policy recommendations. Both methods may produce recommendations individually. Having recommendations from two methods may improve the results and/or help to reduce false positives in the recommendation list, since each method can be used to validate the other.

Further reduction of false positives may be achieved by a request-response process. In a request-response pair process, the port traffic logs are halved by pairing a request log with a response log. The systems/methods may check for recommendations that are part of both request and response logs records and mark any such recommendation as a false positive.

Although the correctness of the recommendations as described herein may be improved, it is possible that the approach may not cover all ports required by an application, as the approach described herein depends on the time period of the logs that are considered and the variability of the traffic during the period.

Finally, this algorithm is a continuous process and any new servers in the application or communication with other servers need not be evaluated separately.

Further Definitions and Embodiments

As will be appreciated by one of skill in the art, the present inventive concepts may be embodied as a method, data processing system, and/or computer program product. Accordingly, the present inventive concepts may take the form of an entirely hardware embodiment, an entirely software embodiment or an embodiment combining software and hardware aspects all generally referred to herein as a "circuit" or "module." Furthermore, the present inventive concepts may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

The embodiments described herein provide useful physical machines and particularly configured computer hardware arrangements of computing devices, servers, electronic gaming terminals, processors, memory, networks, for example. Components of the computer may include, but are not limited to, a processing unit including a processor circuit, such as a programmable microprocessor or microcontroller, a system memory, and a system bus that couples various system components including the system memory to the processing unit.

The processor circuit may be a multi-core processor including two or more independent processing units. Each of the cores in the processor circuit may support multi-threading operations, i.e., may have the capability to execute multiple processes or threads concurrently. Additionally, the processor circuit may have an on-board memory cache. An example of a suitable multi-core, multithreaded processor circuit is an Intel® Core i7-7920HQ processor, which has four cores that support eight threads each and has an 8 MB on-board cache. In general, the processor circuit may, for example, include any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer typically includes a variety of computer readable media. Computer readable media can be any available media that can be accessed by computer and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic disk storage or other magnetic storage devices, or any other medium which can be used to store the desired information and which can accessed by the computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory includes computer storage media in the form of volatile and/or nonvolatile memory such as read only memory (ROM) and random access memory (RAM). A basic input/output system (BIOS), containing the basic routines that help to transfer information between elements within the computer, such as during start-up, is typically stored in the ROM. The RAM typically contains data and/or program modules that are immediately accessible to and/or presently being operated on by the processing unit. The system memory may store an operating system, application programs, other program modules, and program data.

The computer may also include other removable/non-removable, volatile/nonvolatile computer storage media. By way of example only, the computer may include a hard disk drive reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk such as a CD ROM or other optical media. Other removable/non-removable, volatile/nonvolatile computer storage media that can be used in the illustrative operating environment include, but are not limited to, magnetic tape cassettes, flash memory cards, digital versatile disks, digital video tape, solid state RAM, solid state ROM, and the like. The hard disk drive is typically connected to the system bus through a non-removable memory interface.

The drives and their associated computer storage media discussed above provide storage of computer readable instructions, data structures, program modules and other data for the computer. A user may enter commands and information into the computer through input devices such as a keyboard and pointing device, commonly referred to as a mouse, trackball or touch pad. Other input devices (not shown) may include a microphone, joystick, game pad, satellite dish, scanner, touchscreen, or the like. These and other input devices are often connected to the processing unit through a user input interface that is coupled to the system bus, but may be connected by other interface and bus structures, such as a parallel port, game port or a universal serial bus (USB). A monitor or other type of display device is also connected to the system bus via an interface, such as a video interface. In addition to the monitor, computers may also include other peripheral output devices such as speakers and a printer, which may be connected through an output peripheral interface.

The computer may operate in a networked environment using logical connections to one or more remote computers, such as a remote computer. The remote computer may be a personal computer, a server, a router, a network PC, a peer device or other common network node, and typically includes many or all of the elements described above relative to the computer. The logical connections include a local area network (LAN) connection and a wide area network (WAN) connection, but may also include other networks. Such networking environments are commonplace in offices, enterprise-wide computer networks, intranets and the Internet.

When used in a LAN networking environment, the computer may be connected to the LAN through a network interface or adapter. When used in a WAN networking environment, the computer may include a modem or other means for establishing communications over the WAN. The modem, which may be internal or external, may be connected to the system bus via the user input interface, or other appropriate mechanism.

Some embodiments of the present inventive concepts are described herein with reference to flowchart illustrations and/or block diagrams of methods, systems and computer program products according to embodiments of the inventive concepts. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the present inventive concepts may be written in an object oriented programming language such as Java or C++. However, the computer program code for carrying out operations of the present inventive concepts may also be written in conventional procedural programming languages, such as the "C" programming language. The program code may execute entirely on the user's computer, partly on the user's computer, as a stand alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the inventive concepts and, although specific terms are employed, they are used in a generic and descriptive sense only and not for purposes of limitation, the scope of the inventive concepts being set forth in the following claims.

What is claimed is:

1. A computer-implemented method of generating a security policy for a microsegmented computing system, comprising:

generating, via a microprocessor circuit coupled to a memory, a port service map comprising a plurality of entities, wherein the port service map indicates inbound packet activity by port for a plurality of network addresses with the microsegmented computing system; and generating, via the microprocessor circuit, a first plurality of security policy recommendations based on the port service map, wherein generating the first plurality of security policy recommendations comprises:

generating a metric for each entry in the port service map;

obtaining a port traffic log of traffic in the microsegmented computing system, wherein the port traffic log contains log records of packets transmitted in the microsegmented computing system, wherein each log record in the port traffic log includes a source network address, a source port number, a destination network address, and a destination port number associated with the log record;

for a selected log record in the port traffic log, determining if the metric for an entry in the port service map having a same destination network address and a same destination port as the selected log record is greater than a threshold; and in response to determining the metric is greater than the threshold, generating a security policy recommendation including the source network address, the destination network address, and the destination port number included in the selected log record.

2. The computer-implemented method of claim 1, further comprising:

generating an estimated accuracy for each entry in the port service map, wherein the metric for each entry in the port service map comprises the estimated accuracy for the entry in the port service map.

3. The computer-implemented method of claim 2, further comprising:

for each security policy recommendation in the first plurality of security policy recommendations, assigning, to the security policy recommendation, an estimated accuracy based on the estimated accuracy for a corresponding entry in the port service map.

4. The computer-implemented method of claim 1, further comprising:

generating a port distribution map comprising a plurality of entries, wherein the port distribution map indicates outbound packet activity by the port for the plurality of network addresses within the microsegmented computing system; and generating a second plurality of security policy recommendations based on the port distribution map.

5. The computer-implemented method of claim 4, wherein each of the entries in the port distribution map comprises a source network address and a source port associated with the entry, and wherein generating the second plurality of security policy recommendations comprises:

generating a second metric for each entry in the port distribution map;

for a second selected log record in the port traffic log, determining if the second metric for an entry in the port distribution map having a same source network address and a same source port as the second selected log record is greater than a second threshold; and in response to determining the second metric is greater than the second threshold, generating a second security policy recommendation including the source network address, the destination network address, and the destination port number included in the second selected log record.

6. The computer-implemented method of claim 5, further comprising:

generating an estimated accuracy associated with each entry in the port distribution map, wherein the second metric comprises the estimated accuracy for the entry in the port distribution map.

7. The computer-implemented method of claim 6, further comprising:

for each security policy recommendation in the second plurality of security policy recommendations, assigning, to the second security policy recommendation, an estimated accuracy based on the estimated accuracy for a corresponding entry in the port distribution map.

8. The computer-implemented method of claim 4, further comprising:

generating an estimated accuracy for each entry in the port distribution map; and for each security policy recommendation in the first plurality of security policy recommendations:

identifying a corresponding entry in the port distribution map corresponding to the security policy recommendation;

determining whether the estimated accuracy for the corresponding entry in the port distribution map is greater than a threshold; and in response to determining that the estimated accuracy for the corresponding entry in the port distribution map is not greater than the threshold, making the security policy recommendation as a false positive.

9. The computer-implemented method of claim 4, further comprising:

generating estimated accuracies for each entry in the port service map and each entry in the port distribution map;

combining the first plurality of security policy recommendations and the second plurality of security policy recommendations to form a recommendation list by:

identifying a first corresponding entry in the port distribution map corresponding to the security policy recommendation and a second corresponding entry in the port service map corresponding to the security policy recommendation;

determining whether an estimated accuracy for the first corresponding entry in the port distribution map is greater than a first threshold;

in response to determining that the estimated accuracy for the first corresponding entry in the port distribution map is not greater than the first threshold, making the security policy recommendation as a false positive and assigning to the security policy recommendation an accuracy corresponding to an estimated accuracy for the second corresponding entry in the port service map;

in response to determining that the estimated accuracy for the first corresponding entry in the port distribution map is greater than the first threshold, determining whether the estimated accuracy for the second corresponding entry in the port service map is greater than a second threshold; and in response to determining that the estimated accuracy for the second corresponding entry in the port service map is not greater than the second threshold, marking the security policy recommendation as a false positive and assigning to the security policy recommendation an accuracy corresponding to an estimated accuracy for the first corresponding entry in the port distribution map.

10. The computer-implemented method of claim 1, wherein generating the port service map comprises:

grouping log entries in the port traffic log by destination network address and destination port number pairs to form entries in the port service map;

generating an inbound packet count, inbound_count, for each entry in the port service map;

sorting the entries in the port service map by inbound packet count; and generating a difference value, inbound_diff, for each entry in the port service map, wherein the difference value is generated by subtracting the inbound packet count for a next succeeding entry from the inbound packet count for the entry.

11. The computer-implemented method of claim 10, further comprising:

determining a smallest value, min_count, of the inbound_count in the port service map;

starting with a first entry in the port service map having a highest inbound packet count, determining of each of a next n number of entries in the port service map satisfies an inequality inbound_diff<=min_count, where n is a positive integer; and in response to determining that each of the next n number of entries in the port service map satisfies the inequality inbound_diff<=min_count, determining a cut-off value, last_value, for the port service map.

12. The computer-implemented method of claim 1, wherein generating the port service map comprises:

grouping log entries in the port traffic log by destination network address and destination port number pairs to form entries in the port service map;

generating an inbound packet count, inbound_count, for each entry in the port service map;

sorting the entries in the port service map by the inbound packet count;

generating a moving average of inbound_count, moving average, for each entry in the port service map; and generating an average difference value, avg_diff, for each entry in the port service map wherein a value of the avg_diff is generated by subtracting a value of the moving_average for a next succeeding entry from the value of moving_average for the entry.

13. The computer-implemented method of claim 10, further comprising:

determining a smallest value, min_count, of the inbound_count in the port service map;

starting with a first entry in the port service map having a highest inbound packet count, determining of each of a next n number of entries in the port service map satisfies an inequality avg_diff<=min_count, where n is a positive integer; and in response to determining that each of the next n number of entries in the port service map satisfies the inequality avg_diff<=min_count, determining a cut-off value, last_value, for the port service map.

14. The computer-implemented method of claim 1, further comprising:

generating an estimated accuracy for each of the first plurality of security policy recommendations; and generating a security policy based on the first plurality of security policy recommendations and the estimated accuracy for each of the first plurality of security policy recommendations.

15. The computer-implemented method of claim 1, further comprising:

generating a microsegmentation security policy based on the first plurality of security policy recommendations; and applying the microsegmentation security policy to internal communications within the microsegmented computing system.

16. A computer-implemented method of generating a security policy to internal communications within a microsegmented computing system, comprising:

generating, via a microprocessor circuit coupled to a memory, a port service map that indicates inbound packet activity by port for a plurality of network addresses within the microsegmented computing system;

generating, via the microprocessor circuit, a first plurality of security policy recommendations based on the port service map;

generating, via the microprocessor circuit, a port distribution map that indicates outbound packet activity by the port for the plurality of network addresses;

generating, via the microprocessor circuit, a second plurality of security policy recommendations based on the port distribution map by:

generating a metric for each entry in the port distribution map;

obtaining a port traffic log of traffic in the microsegmented computing system, wherein the port traffic log contains log records of packets transmitted in the microsegmented computing system, and wherein each of the log records includes a source network address, a source port number, a destination network address, and a destination port number;

for a selected log record in the port traffic log, determining if the metric for an entry in the port distribution map having a same source network address and a same source port number as the selected log record is greater than a threshold; and in response to determining that the metric is greater than the threshold, generating a security policy recommendation including the source network address, the destination network address, and the destination port number included in the selected log record.

17. The computer-implemented method of claim 16, further comprising:

identifying false positive security policy recommendations in the first plurality of security policy recommendations based on the port service map.

18. The computer-implemented method of claim 16, wherein generating the second plurality of security policy recommendations further comprises validating the second plurality of security policy recommendations based on the port distribution map.

19. A computer-implemented method of generating a security policy for a microsegmented computing system, comprising:

generating, via a microprocessor circuit coupled to a memory, a port service map that indicates inbound packet activity by port for a plurality of network addresses within the microsegmented computing system, wherein generating the port service map comprises:

obtaining a port traffic log of traffic in the micro segmented computing system, wherein the port traffic log contains log records of packets transmitted in the microsegmented computing system, wherein each of the log records is identified by a source network address, a source port number, a destination network address, and a destination port number;

grouping log entries in the port traffic log by pairs of the destination network address and the destination port number to form entries in the port service map;

generating an inbound packet count for each of the entries in the port service map;

sorting the entries in the port service map by the inbound packet count for each of the entries in the port service map; and generating a difference value for each of the entries in the port service map, wherein the difference value is generated by subtracting the inbound packet count for a next succeeding entry from the inbound packet count for an entry.

* * * * *